US010442732B2

(12) United States Patent
Vilinska et al.

(10) Patent No.: US 10,442,732 B2
(45) Date of Patent: Oct. 15, 2019

(54) GYPSUM SLURRIES WITH LINEAR POLYCARBOXYLATE DISPERSANTS

(71) Applicant: United States Gypsum Company, Chicago, IL (US)

(72) Inventors: Annamaria Vilinska, Chicago, IL (US); Alfred C. Li, Naperville, IL (US); Mario Dupuis, Greenfield Park (CA); Iordana Triantafillu, Brossard (CA); Francis Loiseau, St-Hubert (CA)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/588,756

(22) Filed: May 8, 2017

(65) Prior Publication Data
US 2017/0334778 A1 Nov. 23, 2017

Related U.S. Application Data

(60) Provisional application No. 62/339,383, filed on May 20, 2016.

(51) Int. Cl.
C04B 24/26 (2006.01)
C04B 28/14 (2006.01)
C04B 24/38 (2006.01)
C04B 14/10 (2006.01)
B32B 13/08 (2006.01)
C04B 24/16 (2006.01)
C04B 103/40 (2006.01)
C04B 111/00 (2006.01)

(52) U.S. Cl.
CPC .......... C04B 24/2652 (2013.01); B32B 13/08 (2013.01); C04B 14/10 (2013.01); C04B 24/163 (2013.01); C04B 24/2641 (2013.01); C04B 24/38 (2013.01); C04B 28/14 (2013.01); C04B 28/145 (2013.01); B32B 2419/00 (2013.01); B32B 2607/00 (2013.01); C04B 2103/402 (2013.01); C04B 2103/408 (2013.01); C04B 2111/0062 (2013.01)

(58) Field of Classification Search
None
See application file for complete search history.

(56) References Cited

U.S. PATENT DOCUMENTS

| 2,078,199 A | 4/1937 | King |
| 2,985,219 A | 5/1961 | Summerfield |
| 3,246,063 A | 4/1966 | Podgurski |
| 3,297,601 A | 1/1967 | Maynard et al. |
| 3,547,899 A | 12/1970 | Arlt et al. |
| 3,573,947 A | 4/1971 | Kinkade et al. |
| 3,806,367 A | 4/1974 | Lange et al. |
| 3,898,037 A | 8/1975 | Lange et al. |
| 3,928,196 A | 12/1975 | Persinski et al. |
| 4,009,062 A | 2/1977 | Long |
| 4,203,858 A | 5/1980 | Chakrabarti |
| 4,347,168 A | 8/1982 | Murphy et al. |
| 4,379,061 A | 4/1983 | Rabitsch et al. |
| 4,432,879 A | 2/1984 | Greaves et al. |
| 4,460,720 A | 7/1984 | Gaidis et al. |
| 4,509,987 A | 4/1985 | Farrar et al. |
| 4,561,986 A | 12/1985 | Villa et al. |
| 4,676,835 A | 6/1987 | Green et al. |
| 4,699,225 A | 10/1987 | Bardoliwalla |
| 4,941,536 A | 7/1990 | Brothers et al. |
| 4,992,258 A | 2/1991 | Mason |
| 5,158,612 A | 10/1992 | Savoly et al. |
| 5,176,797 A | 1/1993 | Hartan et al. |
| 5,240,639 A | 8/1993 | Diez et al. |
| 5,320,677 A | 6/1994 | Baig |
| 5,393,845 A | 2/1995 | Korte et al. |
| 5,395,438 A | 3/1995 | Baig et al. |
| 5,472,051 A | 12/1995 | Brothers |
| 5,534,059 A | 7/1996 | Immordino, Jr. |
| 5,643,510 A | 7/1997 | Sucech |
| 5,683,635 A | 11/1997 | Sucech et al. |

(Continued)

FOREIGN PATENT DOCUMENTS

| CN | 103664043 A | 3/2014 |
| DE | 19830760 A1 | 1/2000 |

(Continued)

OTHER PUBLICATIONS

A. Amjad, Influence of Polymer Architecture on the Stabilization of Iron and Manganese LONS in Aqueous Systems, Carl Hanser Publisher, Munich, Germanry, pp. 202-208, URL:<www.TSD-journal.com>, 2007.

Ethacryl™ M, URL: <http://www.arkema.com/en/products/product-finder/product-viewer/Ethacryl-M>, retrieved from the Internet Nov. 11, 2015.

Ethacryl™, URL: <http://www.arkema.com/en/products/product-finder/range-viewer/Ethacryl/?t=2>, retrieved from the Internet Nov. 11, 2015.

Bagaria et al., Langmuir, Stabilization of Iron Oxide Nanoparticles in High Sodium and Calcium Brine at High Temperatures With Adsorbed Sulfonated Copolyners, American Chemical Society, pp. 3195-3206, 2013.

(Continued)

Primary Examiner — Jeffrey D Washville
(74) Attorney, Agent, or Firm — Vorys, Sater, Seymour and Pease LLP; Pradip Sahu; Philip T. Petti

(57) ABSTRACT

A gypsum slurry includes water, a hydraulic component including calcium sulfate hemihydrate and a linear polycarboxylate dispersant. The linear polycarboxylate anionic dispersant includes a first monomeric repeating unit and a second monomeric repeating unit. The first repeating unit of the linear polycarboxylate dispersant is an olefinic unsaturated carboxylic acid repeating unit or salt thereof. The second repeating unit of the linear polycarboxylate dispersant is a vinyl sulfonate. The slurry can be made into a gypsum panel. Methods of making gypsum slurry and a gypsum panel are also disclosed.

20 Claims, 4 Drawing Sheets

(56) References Cited

U.S. PATENT DOCUMENTS

| | | |
|---|---|---|
| 5,718,759 A | 2/1998 | Stav et al. |
| 5,798,425 A | 8/1998 | Albrecht et al. |
| 6,265,477 B1 | 7/2001 | Hurlock |
| 6,342,284 B1 | 1/2002 | Yu et al. |
| 6,409,825 B1 | 6/2002 | Yu et al. |
| 6,527,850 B2 | 3/2003 | Schwartz et al. |
| 6,632,550 B1 | 10/2003 | Yu et al. |
| 6,995,105 B1 | 2/2006 | Wache et al. |
| 7,070,648 B1 | 7/2006 | Schwartz et al. |
| 7,230,061 B2 | 6/2007 | Shioji et al. |
| 7,462,676 B2 | 12/2008 | Suau et al. |
| 7,572,329 B2 | 8/2009 | Liu et al. |
| 7,608,347 B2 | 10/2009 | Lettkeman et al. |
| 7,767,019 B2 | 8/2010 | Liu et al. |
| 7,776,462 B2 | 8/2010 | Liu et al. |
| 7,932,308 B2 | 4/2011 | Lettkeman et al. |
| 8,053,497 B2 | 11/2011 | Suau et al. |
| 8,142,915 B2 | 3/2012 | Blackburn et al. |
| 8,617,451 B2 | 12/2013 | Fisher et al. |
| 8,801,852 B2 | 8/2014 | Lee et al. |
| 8,906,986 B2 | 12/2014 | Schinabeck et al. |
| 2004/0266932 A1 | 12/2004 | Mosquet et al. |
| 2006/0278128 A1 | 12/2006 | Liu et al. |
| 2006/0278130 A1 | 12/2006 | Liu et al. |
| 2006/0280898 A1 | 12/2006 | Lettkeman et al. |
| 2008/0148997 A1 | 6/2008 | Blackburn et al. |
| 2009/0163622 A1 | 6/2009 | Albrecht et al. |
| 2012/0270969 A1* | 10/2012 | Bichler .................. C04B 28/04 524/5 |
| 2013/0330532 A1 | 12/2013 | Dierschke et al. |
| 2015/0031836 A1 | 1/2015 | Ikeda et al. |
| 2015/0232597 A1 | 8/2015 | Hampel et al. |

FOREIGN PATENT DOCUMENTS

| | | |
|---|---|---|
| EP | 1024154 A2 | 8/2000 |
| EP | 1419123 B1 | 6/2006 |
| EP | 2692752 A1 | 2/2014 |
| WO | 9516515 A1 | 6/1995 |
| WO | 2009068899 A2 | 6/2009 |
| WO | 2010003867 A1 | 1/2010 |
| WO | 2015004219 A1 | 1/2015 |

OTHER PUBLICATIONS

Superplasticizer, From Wikipedia, URL:<https://en.wikipedia.org/wiki/Superplasticizer>, retrieved from the Internet Nov. 11, 2015.

Dietzsch et al., Langmuir, PAA-PAMPS Copolymers as an Efficient Tool to Control CaCO3 Scale Formation, American Chemical Society, pp. 3080-3088, 2013.

Mighty 21EG, KAO Specialties Americas LLC, URL: <http://chemical.kao.com/us/pdf/catalog/catalog_B0034707.pdf>, retrieved from the Internet May 11, 2017.

* cited by examiner

GYPSUM SLURRIES WITH LINEAR POLYCARBOXYLATE DISPERSANTS

FIELD OF THE INVENTION

This invention relates to a method and composition for preparing set gypsum-containing products, e.g., gypsum boards, reinforced gypsum composite boards, plasters, machinable materials, joint treatment materials, and acoustical tiles, and methods and compositions for producing them. More particularly, the invention concerns such set gypsum-containing products made employing one or more linear polycarboxylates as dispersant. This is also suitable to improve dispersions of high clay stucco sources.

BACKGROUND

Many well-known useful products contain set gypsum (calcium sulfate dihydrate) as a significant, and often as the major, component. For example, set gypsum is the major component of paper-faced gypsum boards employed in typical drywall construction of interior walls and ceilings of buildings (see, e.g., U.S. Pat. Nos. 4,009,062 and 2,985,219). It is also the major component of gypsum/cellulose fiber composite boards and products, as described in U.S. Pat. No. 5,320,677. Products that fill and smooth the joints between edges of gypsum boards often contain major amounts of gypsum (see, e.g., U.S. Pat. No. 3,297,601). Acoustical tiles useful in suspended ceilings can contain significant percentages of set gypsum, as described, for example, in U.S. Pat. Nos. 5,395,438 and 3,246,063. Traditional plasters in general, e.g., for use to create plaster-surfaced internal building walls, usually depend mainly on the formation of set gypsum. Many specialty materials, such as a material useful for modeling and mold-making that can be precisely machined as described in U.S. Pat. No. 5,534,059, contain major amounts of gypsum.

Most such gypsum-containing products are prepared by forming a mixture of calcined gypsum (calcium sulfate hemihydrate and/or calcium sulfate anhydrite) and water (and other components, as appropriate), casting the mixture into a desired shaped mold or onto a surface, and allowing the mixture to harden to form set (i.e., rehydrated) gypsum by reaction of the calcined gypsum with the water to form a matrix of crystalline hydrated gypsum (calcium sulfate dihydrate). This is often followed by mild heating to drive off the remaining free (unreacted) water to yield a dry product. It is the desired hydration of the calcined gypsum that enables the formation of an interlocking matrix of set gypsum crystals, thus imparting strength to the gypsum structure in the gypsum-containing product.

All of the gypsum-containing products described above could benefit if the strength of their component set gypsum crystal structures were increased in order to make them more resistant to the stresses they may encounter during use.

To make wallboard panels a slurry, including calcium sulfate hemihydrate and water, is used to form the core, and is continuously deposited on a paper cover sheet moving beneath a mixer. A second paper cover sheet is applied thereover and the resultant assembly is formed into the shape of a panel. Calcium sulfate hemihydrate reacts with a sufficient amount of the water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture. Since each of these steps takes only minutes, small changes in any of the process steps can lead to gross inefficiencies in the manufacturing process.

The amount of water added to form the slurry is in excess of that needed to complete the hydration reaction. Some of the water that is added to the gypsum slurry is used to hydrate the calcined gypsum, also known as calcium sulfate hemihydrate, to form an interlocking matrix of calcium sulfate dihydrate crystals. Excess water gives the slurry sufficient fluidity to flow out of the mixer and onto the facing material to be shaped to an appropriate width and thickness. While the product is wet, it is very heavy to move and relatively fragile. The excess water is removed from the board by evaporation. If the excess water were allowed to evaporate at room temperature, it would take a great deal of space to stack and store wallboard while it was allowed to air dry or to have a conveyor long enough to provide adequate drying time. Until the board is set and relatively dry, it is somewhat fragile, so it must be protected from being crushed or damaged.

To dry the boards in a relatively short period of time, the wallboard product is usually dried by evaporating the extra water at elevated temperatures, for example, in an oven or kiln. It is relatively expensive to build and operate the kiln at elevated temperatures, particularly when the cost of fossil fuels rises. A reduction in production costs could be realized by reducing the amount of excess water present in set gypsum boards that is later removed by evaporation.

Another reason to decrease water is that the strength of gypsum products is inversely proportional to the amount of water used in its manufacture, especially in full density slurries. As the excess water evaporates, it leaves voids in the matrix once occupied by the water. Where large amounts of water were used to fluidize the gypsum slurry, more and larger voids remain in the product when it is completely dry. These voids decrease the product density and strength in the finished product.

Dispersants are known for use with gypsum to help fluidize the mixture of water and calcium sulfate hemihydrate so less water is needed to make flowable slurry.

Currently there are two main commercial options for gypsum slurry dispersants. 1) Polynaphthalene sulfonate dispersants and 2) Branched polycarboxylates.

Polynaphthalene sulfonate dispersants are well known and relatively cheaper, but have limited efficacy. Polynaphthalene sulfonate has good compatibility with starch, foaming agents, and clays. A production process for polynaphthalene sulfonates includes the following reaction steps: sulfonation of naphthalene with sulfuric acid producing b-naphthalene-sulfonic acid, condensation of b-naphthalene sulfonic acid with formaldehyde producing polymethylene naphthalene sulfonic acid, and neutralization of polymethylene naphthalene sulfonic acid with sodium hydroxide or another hydroxide. Depending on reaction conditions products with different characteristics are obtained.

U.S. Pat. No. 4,460,720 to Gaidis et al discloses a superplasticizer cement admixture for Portland based compositions formed from a low molecular weight alkali metal polyacrylate in combination with an alkali metal or alkaline earth metal polynaphthalene sulfonate-formaldehyde or an alkali metal lignosulfonate or an alkaline earth metal lignosulfonate or mixtures thereof.

U.S. Pat. No. 5,718,759 discloses the addition of silicates to mixtures of beta-calcined gypsum and cement. In the examples, lignosulfates or polynaphthalene sulfonates are used as water-reducing agents. The addition of pozzolanic materials, including silicates, is credited with-reducing expansion due to the formation of ettringite. The composition is suggested for use in building materials, such as backer boards, floor underlayments, road patching materials, fire-stopping materials and fiberboard.

Branched polycarboxylates are more expensive and more effective dispersants. However, they are less effective for stuccos with clay. Also, the branched polycarboxylates can reduce board strength and are surface active and can interfere with the foaming agent. Also, due to the side chains of the branched polycarboxylates, they cannot be mixed with the polynaphthalene sulfonate. U.S. Pat. No. 7,767,019 to Liu et al discloses embodiments of branched polycarboxylates.

Thus, there is a continuing need for new and improved set gypsum-containing products, and compositions and methods for producing them, that solve, avoid, or minimize the problems noted above. There is a need in the art to reduce the dosage of dispersants used in gypsum slurry while maintaining flowability of the slurry. Reduction in dispersant use would result in saving of costs spent on the dispersant

SUMMARY OF THE INVENTION

As an alternative to the above mentioned products containing gypsum and branched polycarboxylate super-dispersants the present invention provides products and compositions containing gypsum and linear polycarboxylate based dispersants. These dispersants are effective to disperse gypsum slurries. Unlike commercial branched polycarboxylate super-dispersants the linear polycarboxylates avoid the problems associated with the side chains of the branched polycarboxylates and are more similar to polynaphtalene sulfonates.

Thus, the present invention provides a gypsum slurry and method of making same. The gypsum slurry comprising or consisting essentially of:
a mixture of
water;
a hydraulic component comprising at least 50% calcium sulfate hemihydrate by weight based on the dry weight of the hydraulic component; and
a linear polycarboxylate anionic dispersant consisting essentially of a first monomeric repeating unit A and a second monomeric repeating unit B, and an absence of polyvinyl acetate monomeric units;
wherein the first repeating unit A is at least one carboxylic acid functional group containing olefinic moiety of formula I:

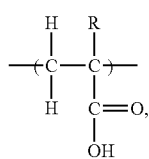

wherein R is selected from the group consisting of —CH$_3$ and —CH$_2$—C(O)—OH, or a Na, K, or NH$_4^+$ salt thereof; and
wherein the second monomeric repeating unit B is at least one vinyl sulfonate according to formula II:

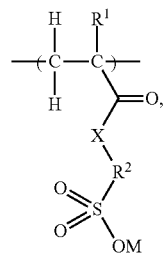

wherein X is NH or O; R$^1$ is H or —CH$_3$; R$^2$ is a linear or branched alkylene group having the formula —(C$_n$H$_{2n}$)—, wherein n=2 to 6; M=H, Na, K, or NH$_4^+$;
wherein the molar ratio of the first repeating unit A to the second repeating unit B is between 1:9 and 9:1;
wherein the weight average molecular weight of the linear polycarboxylate anionic dispersant is 3000 to 100000 Daltons;
wherein the slurry has a water to calcium sulfate hemihydrate weight ratio of 0.1-1.5:1, preferably 0.2-0.8:1, more preferably 0.4-0.8:1.

In the present application the term consisting essentially of is intended to exclude the second repeating units of Formula I of US Published Patent Application No. 2006/0278130 to Liu et al which have side chains containing ethylene oxide, propylene oxide, and a non-substituted or substituted aryl group. The term consisting essentially of is also intended to exclude polyvinyl acetate monomeric units.

Weight average molecular weights are between 3000 and 100000 Daltons, preferably 5000-60000 Daltons, most preferably 5000 to 35000 Daltons.

The molar ratio of the first repeating unit A to the second repeating unit B is between 1:9 and 9:1. Where the first repeating unit A is methacrylic acid (MAA) repeating unit the molar ratio of the first repeating unit A to the second repeating unit B is between 1:4 and 4:1, preferably 2:3 to 7:3. Where the first repeating unit A is an itaconic acid repeating unit the molar ratio of the first repeating unit A to the second repeating unit B is between 1:9 and 1:1, preferably 1:8 to 1:2.

Adsorption of the linear polycarboxylate polymer molecules of the present invention is stronger than that of polynaphtalene sulfonates and the dispersant surface is more charged. Therefore the repulsive forces allow for higher water reduction than polynaphtalene sulfonates. Moreover, these polymers can be combined with polynaphthalene sulfonates and used for more challenging and heterogeneous stuccos. Linear polycarboxylates are more effective dispersants than polynaphthalene sulfonates and have very low air entrapment capacities. Thus, they are more suitable for applications sensitive to foaming. Due to the lack of side chains of the second repeating units of Formula I of US Published Patent Application No. 2006/0278130 to Liu et al these linear polycarboxylates when added as dispersants to gypsum slurry do not interfere with foam added to the slurry.

The linear polycarboxylate dispersants can also improve dispersions of the hydraulic component when the hydraulic component is a high clay stucco source. High clay stucco sources are those comprising calcium sulfate hemihydrate and clay, wherein the calcium sulfate hemihydrate comprises at least 80 wt. % of the stucco and the clay comprises 0.01 to 20 wt. % of the stucco, especially 0.1 to 20 wt. % of the stucco or more especially 0.5 to 15 wt. % of the stucco.

The linear polycarboxylate dispersants may be used with polynaphthalene sulfonate dispersants. The naphthalene sulfonate monomeric units are naphthalene sulfonate plus formaldehyde according to formula VI respectively.

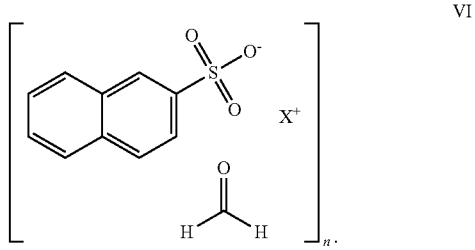

VI

As used herein, the term, "calcium sulfate material", is intended to mean calcium sulfate anhydrite; calcium sulfate hemihydrate; calcium sulfate dihydrate; ions of calcium and sulfate; or mixtures of any or all thereof. Preferably the calcium sulfate material added to make the slurry is mostly calcium sulfate hemihydrate.

The method of making the slurry comprises
mixing water, a hydraulic component comprising calcium sulfate dihydrate, and the above-described linear polycarboxylate anionic dispersant to make the slurry, wherein a weight ratio of the water to calcium sulfate hemihydrate being mixed is 0.2-1.5:1, preferably 0.2-0.8:1, more preferably 0.4-0.7:1;
wherein the linear polycarboxylate anionic dispersant comprises the above described first monomeric repeating unit A and the above described second monomeric repeating unit B, and an absence of polyvinyl acetate monomeric units.

The invention also provides a set gypsum product preferably a gypsum board comprising:
a gypsum core material comprising calcium sulfate dihydrate and the above-described linear polycarboxylate anionic dispersant comprising the above-described first monomeric repeating unit A and the above-described second monomeric repeating unit B, and an absence of polyvinyl acetate monomeric units.

The set gypsum-containing product of the invention is prepared in accordance with the invention by forming a mixture of a calcium sulfate material, water, and an appropriate amount of the above-listed one or more linear polycarboxylate dispersants of the present invention. The mixture is then maintained under conditions sufficient for the calcium sulfate material to form the improved set gypsum material.

Preferably the method for producing a set gypsum-containing product, such as a board, comprises forming a mixture of calcined gypsum, water, and linear polycarboxylate dispersant, and maintaining the mixture under conditions (e.g., a temperature preferably less than about 120° F.) sufficient for the calcined gypsum to convert to set gypsum.

Preferably the slurry is made into a gypsum panel comprising a gypsum core material comprising the linear polycarboxylate dispersant and a hydraulic component comprising at least 50% calcium sulfate hemihydrate by weight based on the dry weight of the hydraulic component.

The method of the present invention may produce a gypsum board comprising a core of set gypsum sandwiched between cover sheets of paper or other material. Preferably the board is prepared by forming a flowable mixture (slurry) of calcined gypsum, water, and linear polycarboxylate dispersant, depositing it between cover sheets, and allowing the resultant assembly to set and dry. The slurry is deposited onto a first cover sheet then a second cover sheet is applied over the setting slurry.

In particular the method of making the gypsum board comprises:
mixing the water, the hydraulic component comprising calcium sulfate dihydrate, and the linear polycarboxylate to make a slurry, wherein a weight ratio of the water to calcium sulfate hemihydrate being mixed is 0.2-1.5:1, preferably 0.2-0.8:1, more preferably 0.4-0.7:1;
depositing the slurry on a cover sheet to form a gypsum core material;
wherein the slurry has 5 to 70 volume percent air bubbles;
allowing calcium sulfate hemihydrate in the slurry to convert to calcium sulfate dihydrate, and allowing the slurry to set to form the board.

All percentages and ratios are by weight unless otherwise indicated. All molecular weights are weight average molecular weights unless otherwise indicated.

DESCRIPTION OF PREFERRED EMBODIMENTS

Figure 1:
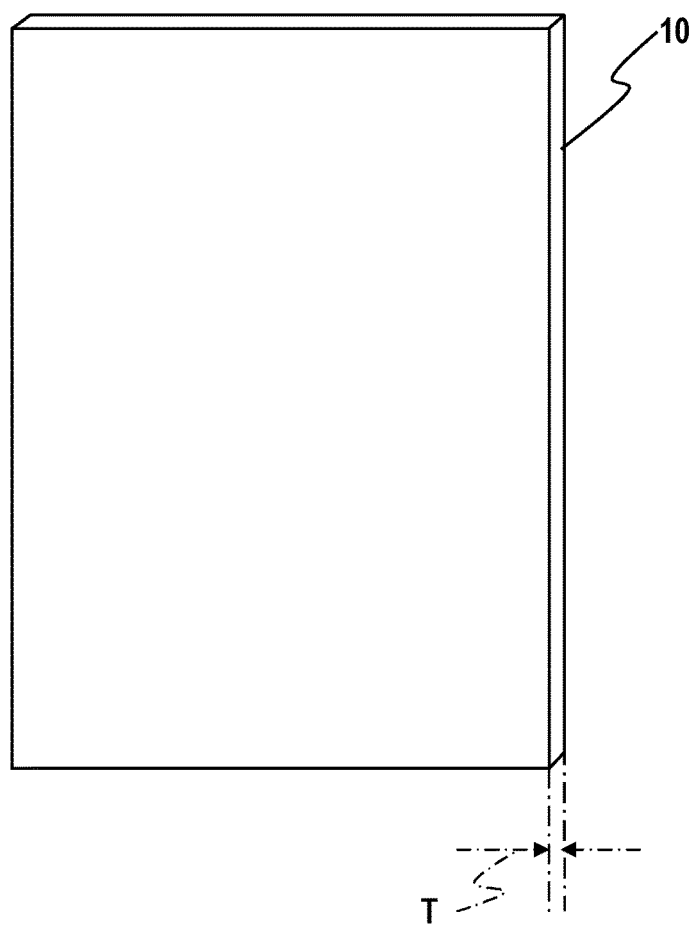
FIG. 1 shows a board of the present invention.

The present invention provides a gypsum slurry made from calcium sulfate hemihydrate, water and a linear polycarboxylate anionic dispersant of the present invention.

The present invention can be practiced employing compositions and methods similar to those employed in the prior art to prepare various set gypsum-containing products. The essential difference in the compositions and methods of this invention from compositions and methods employed in the prior art to prepare various set gypsum-containing products is that it employs linear polycarboxylate anionic dispersant as a dispersant.

The hydraulic material includes any calcium sulfate hemihydrate, also known as stucco or calcined gypsum, preferably in amounts of at least 50%. Preferably, the amount of calcium sulfate hemihydrate is at least 75%, at least 80% or at least 85%. In many wallboard formulations, the hydraulic material is substantially all calcium sulfate hemihydrate. Any form of calcined gypsum may be used, including but not limited to alpha or beta stucco. Use of calcium sulfate anhydrite, synthetic gypsum or landplaster is also contemplated, although preferably in small amounts of less than 20%. Other hydraulic materials, including cement and fly ash, are optionally included in the slurry.

Although any stucco benefits from this invention, stuccos from different sources include different amounts and types of salt and impurities. The slurry of this invention is less effective when the calcium sulfate hemihydrate has relatively high concentrations of naturally occurring salts. Low-salt stuccos are defined as those having soluble salts of less than 300 parts per million. High salt content stuccos include those having at least 600 parts per million soluble salts. Gypsum deposits from Southard, Okla., Little Narrows, Nova Scotia, Fort Dodge, Iowa, Sweetwater, Tex., Plaster City, Calif. and many other locations meet this preference.

Preferably the calcium sulfate hemihydrate comprises less than 600 ppm of soluble salt.

The linear polycarboxylate anionic dispersant is present in said slurry in amounts from about 0.01% to about 2% by weight of the dry dispersant calculated as a percentage of the dry gypsum. Preferably, the linear polycarboxylate anionic dispersant is present in amounts from about 0.05% to about 0.5% by weight of the dry dispersant calculated as a percentage of the dry gypsum.

The gypsum slurry has a water to calcium sulfate hemihydrate weight ratio of 0.1-1.5:1, preferably 0.2-0.8:1, more preferably 0.4-0.8:1.

Typically air is added to the gypsum slurry. Preferably, the gypsum slurry has 5 to 70 volume percent air, more preferably 10 to 70 volume percent air, most preferably 20 to 60 volume percent air.

Linear Carboxylate Anionic Dispersant

The linear polycarboxylate anionic dispersant consists essentially of a first monomeric repeating unit A and a second monomeric repeating unit B, and an absence of polyvinyl acetate monomeric units.

In the present description of the invention the term consisting essentially of is intended to exclude repeating units having alkyleneoxy side chains. For example it excludes the second repeating units of Formula I of US Published Patent Application No. 2006/0278130 to Liu et al which have side chains containing ethylene oxide, propylene oxide, and a non-substituted or substituted aryl group. The term consisting essentially of is also intended to exclude polyvinyl acetate monomeric units.

The first repeating unit A is at least one carboxylic acid functional group containing olefinic moiety of formula I:

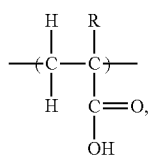

wherein R is selected from the group consisting of —$CH_3$ and —$CH_2$—C(O)—OH, or a Na, K, or $NH_4^+$ salt thereof. This is made from a monomer having formula Ia,

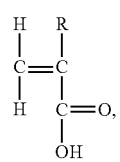

wherein R is selected from the group consisting of —$CH_3$ and —$CH_2$—C(O)—OH, or a Na, K, or $NH_4^+$ salt thereof. In other words, the monomers for making first repeating unit A are methacrylic acid (MAA) of formula Ia or Itaconic acid (IA) of formula Ib,

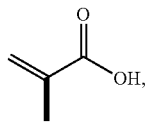

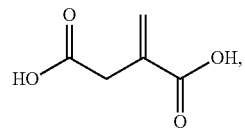

or a Na, K, or $NH_4^+$ salt thereof.

The second repeating unit B of the linear polycarboxylate anionic dispersant of the invention is at least one vinyl sulfonate monomeric unit. The vinyl sulfonate monomeric unit has a vinyl group bound to a sulfonate according to formula II:

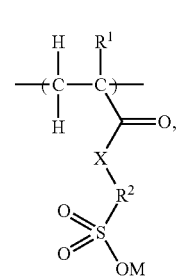

wherein X is NH or O; $R^1$ is H or —$CH_3$; $R^2$ is a linear or branched alkylene group having the formula —$(C_nH_{2n})$—, wherein n is 2 to 6; M is H, Na, K, or $NH_4^+$. This is made from a sulfonate containing monomer of formula IIa:

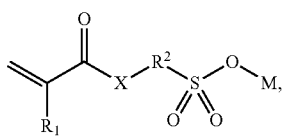

wherein X is NH or O; $R^1$ is H or —$CH_3$; $R^2$ is a linear or branched alkylene group having the formula —$(C_nH_{2n})$—, wherein n is 2 to 6; M is H, Na, K, or $NH_4$.

The molar ratio of the first repeating unit A to the second repeating unit B is between 1:9 and 9:1.

The preferred monomers for making the second repeating unit B are 3-(acryloyloxy)propane sulfonic acid or one of its Na, K, or $NH_4^+$ salts or 2-Acrylamido-2-methyl-1-propane sulfonic acid or one of its Na, K, or $NH_4^+$ salts.

3-(acryloyloxy)propane sulfonic acid has the structure III

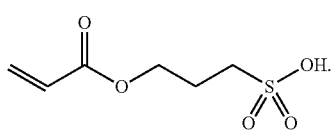

The double bond reacts to convert this to the second repeating unit B of structure IIIa:

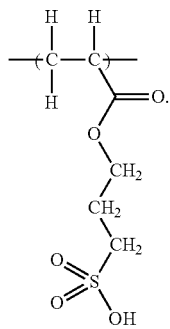

IIIa

2-Acrylamido-2-methyl-1-propane sulfonic acid has the structure IV

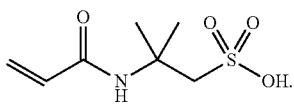

IV

The double bond reacts to convert this to the second repeating unit B of structure IVa:

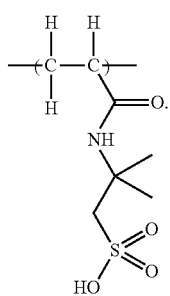

IVa

When the first repeating unit A is of formula I:

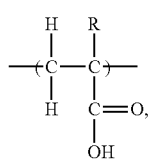

I wherein R is —CH$_3$,
preferably the molar ratio of the first repeating unit A to the second repeating unit B is 1:4 to 4:1, most preferably the molar ratio of the first repeating unit A to the second repeating unit B is 2:3 to 7:3. In other words, preferably first repeating unit A is 20 to 80 mol % and second repeating unit B is 20 to 80 mol %, most preferably first repeating unit A is 40 to 70 mol % and second repeating unit B is 30 to 60 mol %.

When the first repeating unit A is of formula Ia:

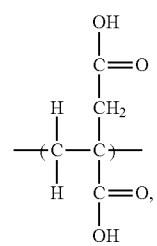

Ia and preferably the molar ratio of the first repeating unit A to the second repeating unit B is 1:9 to 1:1, most preferably 1:8 to 1:2. In other words preferably first repeating unit A is 10 to 50 mol % and second repeating unit B is 50 to 90%, most preferably first repeating unit A is 12 to 33% and second repeating unit B is 67 to 88 mol %.

The weight average molecular weight of the linear polycarboxylate anionic dispersant of the invention is 3,000 to 100,000 Daltons, preferably 5,000 to 60,000 Daltons, most preferably 5,000 to 35,000 Daltons.

The preferred linear polycarboxylate anionic dispersants are selected from at least one member of the group consisting of copolymers of MAA with 3-(acryloyloxy)propane sulfonic acid, copolymers of MAA with 2-Acrylamido-2-methyl-1-propane sodium sulfonate, copolymers of Itaconic acid with 3-(acryloyloxy)propane sulfonic acid, copolymers of Itaconic acid with 2-Acrylamido-2-methyl-1-propane sodium sulfonate, or Na, K, or NH$_4^+$ salts of any of these copolymers.

For example, a preferred linear polycarboxylate anionic dispersant is methacrylic acid-co-2-acrylamido-2-methylpropane sulfonate which is a copolymer of methacrylic acid of formula V

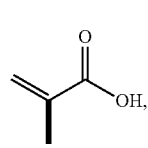

V and

2-Acrylamido-2-methylpropane sulfonic acid of formula VI

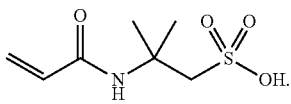

VI

Preferably, the linear polycarboxylate anionic dispersants employed in the present invention are polymers synthetized by radical polymerization combining a carboxylic acid selected from the group consisting of methacrylic acid (MAA), and itaconic acid (IA) and the sulfonate containing monomers of formula IIa

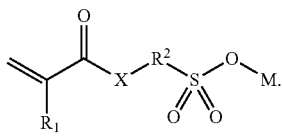

Preferably, the linear polycarboxylate anionic dispersants are synthesized by radical polymerization in aqueous media, using a radical initiator (inorganic peroxide) and standard change transfer agent (mercaptan). Typically a polydispersity above 2.0 is obtained and the polymer end groups are theorized to be a mixture of inactivated versions of the initiator, chain transfer agent, and monomeric units. Other radical polymerization methods may alternatively be used.

The linear polycarboxylate anionic dispersants of the present invention have an absence of polyvinyl acetate monomeric groups. For example, the linear polycarboxylates of the present invention have an absence of the monomeric group of structure VII:

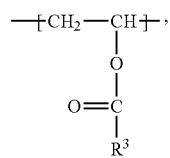

wherein $R^3$ is alkyl, phenyl, or alkyl phenyl.

Also, the linear polycarboxylate anionic dispersants of the present invention have an absence of monomeric repeating units having alkyleneoxy sidechains, for example polypropylene oxide or polyethylene oxide side chains. For example, the linear polycarboxylate anionic dispersants of the present invention have an absence of the second repeating units of Formula I of US Published Patent Application No. 2006/0278130 to Liu et al which have side chains containing ethylene oxide, propylene oxide, and a non-substituted or substituted aryl group. These are alkenyl polyether glycol repeating units according to formula VII.

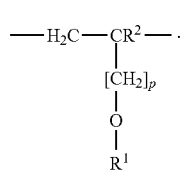

$R_1$ is an alkyleneoxy sidechain represented by Formula VIII

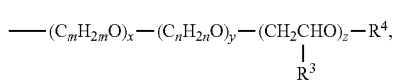

and wherein $R^2$ is hydrogen or an aliphatic $C_1$ to $C_5$ hydrocarbon group, $R^3$ is a non-substituted or substituted aryl group and preferably phenyl, and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to the formula

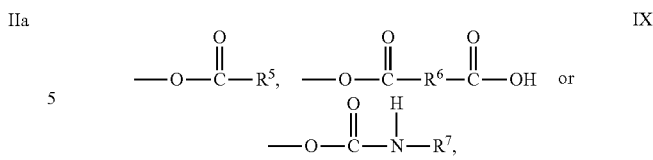

wherein $R^5$ and $R^7$, independently of each other, represent an alkyl, aryl, aralkyl or alkylaryl group and $R^6$ is a divalent alkyl, aryl, aralkyl or alkaryl group, p is 0 to 3, inclusive, m and n are, independently, an integer from 2 to 4, inclusive; x and y are, independently, integers from 55 to 350, inclusive and z is from 0 to 200, inclusive.

Moreover, the linear polycarboxylate anionic dispersants of the present invention preferably have an absence of the following monomeric group of structure X:

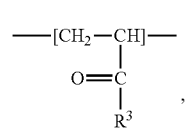

wherein $R^3$ is $NH_2$, $NH(CH_3)$, $N(CH_3)_2$, $-O-CH_3-CH(OH)-CH_3$, $(EO)_n$, $(PO)_m$, wherein n is 1 or more, m is 1 or more.

Moreover, the linear polycarboxylate anionic dispersants of the present invention preferably have an absence of polyvinyl alcohol monomeric unit in its backbone.

Enhancing Materials Chosen from Condensed Phosphoric Acids

Preferably the composition also contains enhancing materials chosen from condensed phosphoric acids, each of which comprises 2 or more phosphoric acid units; and salts or ions of condensed phosphates, each of which comprises 2 or more phosphate units. The enhancing materials are preferably chosen from the group consisting of: phosphoric acids, each of which comprises 1 or more phosphoric acid units; salts or ions of condensed phosphates, each of which comprises 2 or more phosphate units; and monobasic salts or monovalent ions of orthophosphates. The enhancing materials will impart increased resistance to permanent deformation to the set gypsum formed. Moreover, some enhancing materials (e.g., the following salts, or the anionic portions thereof: sodium trimetaphosphate (also referred to herein as STMP), sodium hexametaphosphate having 6-27 repeating phosphate units (also referred to herein as SHMP), and ammonium polyphosphate having 1000-3000 repeating phosphate units (also referred to herein as APP) will provide preferred benefits, such as greater increase in sag resistance. Also, APP provides equal sag resistance to that provided by STMP, even when added in only one fourth the STMP concentration.

Typically, this is accomplished by adding trimetaphosphate ion to a mixture of calcined gypsum and water to be used to produce set gypsum-containing products. As used herein, the term, "calcined gypsum", is intended to mean alpha calcium sulfate hemihydrate, beta calcium sulfate hemihydrate, water-soluble calcium sulfate anhydrite, or mixtures of any or all thereof, and the terms, "set gypsum" and "hydrated gypsum", are intended to mean calcium sulfate dihydrate. The water in the mixture reacts spontaneously with the calcined gypsum to form set gypsum.

Thus, the compositions of the invention preferably include trimetaphosphate salt. The trimetaphosphate salt included in compositions of the invention can comprise any water-soluble trimetaphosphate salt that does not adversely interact with other components of the composition. Some examples of useful salts are sodium trimetaphosphate, potassium trimetaphosphate, ammonium trimetaphosphate, lithium trimetaphosphate, aluminum trimetaphosphate, and mixed salts thereof, among others. Sodium trimetaphosphate is preferred. It is readily commercially available, for example, from Solutia Inc. of St. Louis, Mo., previously a unit of Monsanto Company of St. Louis, Mo.

The trimetaphosphate compound is added to the gypsum slurry to enhance the strength of the product and to improve sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC, St. Louis, Mo. Care must be exercised when using trimetaphosphate with lime or other modifiers that raise the pH of the slurry. Above a pH of about 9.5, the trimetaphosphate loses its ability to strengthen the product and the slurry becomes severely retardive.

In particular, to be used in the practice of one of the preferred methods of the invention, the trimetaphosphate salt is dissolved in the aqueous mixture of calcined gypsum to yield a trimetaphosphate ion concentration of from about 0.004 to about 2.0 percent by weight, based on the weight of the calcined gypsum. A preferred concentration of trimetaphosphate ion is from about 0.04 to about 0.16 percent. A more preferred concentration is about 0.08 percent. If desired for easier storage and delivery in the practice of some embodiments of the invention, the trimetaphosphate salt can be predissolved in water and inserted into the mixture in the form of an aqueous solution.

When employed the trimetaphosphate ion need only be present in the aqueous mixture of calcined gypsum during the hydration of the calcined gypsum to form set gypsum. Therefore, while it is usually most convenient and thus preferred to insert the trimetaphosphate ion into the mixture at an early stage, it is also sufficient to insert the trimetaphosphate ion into the mixture of calcined gypsum and water at a somewhat later stage. For example, in preparing typical gypsum boards, water, linear polycarboxylate dispersant, and calcined gypsum are brought together in a mixing apparatus, are mixed thoroughly, and then are usually deposited onto a cover sheet on a moving belt, and a second cover sheet is placed over the deposited mixture before the major part of the rehydration of calcined gypsum to form set gypsum occurs. While it is most convenient to get the trimetaphosphate ion into the mixture during its preparation in the mixing apparatus, it is also sufficient to add the trimetaphosphate ion at a later stage, e.g., by spraying an aqueous solution of the ion onto the deposited aqueous mixture of calcined gypsum just before the second cover sheet is placed over the deposit, so the aqueous trimetaphosphate ion solution will soak into the deposited mixture and be present when the bulk of the hydration to form set gypsum occurs.

Other alternative methods of getting the trimetaphosphate ion into the mixture will be apparent to those of ordinary skill in the art and are of course considered to be within the scope of the present invention. For example, it may be possible to pre-coat one or both of the cover sheets with a trimetaphosphate salt, so the salt will dissolve and cause trimetaphosphate ion to migrate through the mixture when the deposit of the aqueous mixture of calcined gypsum comes into contact with the cover sheet. Another alternative is to mix a trimetaphosphate salt with raw gypsum even before it is heated to form calcined gypsum, so the salt is already present when the calcined gypsum is mixed with water to cause rehydration.

Other alternative methods of getting the trimetaphosphate ion into the mixture are to add the trimetaphosphate ion to the set gypsum by any suitable means, such as spraying or soaking the set gypsum with a solution containing trimetaphosphate. It has been found the trimetaphosphate ion will migrate to the set gypsum through conventional paper sheets used in the processing of set gypsum.

Calcined Gypsum

The calcined gypsum employed in the invention can be in the form and concentrations typically found useful in the corresponding embodiments of the prior art It can be alpha calcium sulfate hemihydrate, beta calcium sulfate hemihydrate, water-soluble calcium sulfate anhydrite, or mixtures of any or all thereof, from natural or synthetic sources. In some preferred embodiments alpha calcium sulfate hemihydrate is employed for its yield of set gypsum having relatively high strength. In other preferred embodiments beta calcium sulfate hemihydrate or a mixture of beta calcium sulfate hemihydrate and water-soluble calcium sulfate anhydrite are employed.

Water

Water is added to the slurry in any amount that makes a flowable slurry. The amount of water to be used varies greatly according to the application with which it is being used, the exact dispersant being used, the properties of the stucco and the additives being used. The water to stucco weight ratio ("WSR") with wallboard is 0.1-1.5:1, preferably 0.2-0.8:1, more preferably 0.4-0.8:1.

Flooring compositions preferably use a WSR from about 0.17 to about 0.45, preferably from about 0.17 to about 0.34. Moldable or castable products preferably use water in a WSR of from about 0.1 to about 0.3, preferably from about 0.16 to about 0.25. The WSR can be reduced by 0.1 or less in laboratory tests based on the moderate addition of the linear polycarboxylate dispersants. In the invention the water to calcined gypsum (calcium sulfate hemihydrate) weight ratio of the slurry employed to make the board is less than 0.8.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Additives

Other conventional additives can be employed in the practice of the invention in customary amounts to impart desirable properties and to facilitate manufacturing, such as, for example, aqueous foam, set accelerators, set retarders, recalcination inhibitors, binders, adhesives, secondary dispersing aids (other than the linear polycarboxylate dispersants), leveling or non-leveling agents, thickeners, bactericides, fungicides, pH adjusters, colorants, reinforcing materials, fire retardants, water repellants, fillers and mixtures thereof. For example, 1) Polynaphthalene sulfonate dispersants and 2) Branched polycarboxylates are potential secondary dispersing aids.

The gypsum slurry also optionally includes one or more modifiers that enhance the ability of the polycarboxylate dispersant to fluidize the slurry, thus improving its efficacy. The two-repeating unit dispersant used here may be particularly susceptible to the effects of the modifiers. Preferred modifiers include cement, lime, also known as quicklime or calcium oxide, slaked lime, also known as calcium hydroxide, soda ash, also known a sodium carbonate, and other carbonates, silicates, phosphonates and phosphates. Dosage of the modifier is from 0.05% to about 1% depending on the modifier being used and the application with which it is used. When modifiers are used, the efficacy of the dispersant is boosted to achieve a new level of fluidity, or the amount of polycarboxylate dispersant can be decreased to reduce the polycarboxylate expense. Additional information on modifiers and their use is found in U.S. Published Patent Application No. US 2006-0280898 A1, entitled "Modifiers for Gypsum Slurries and Method of Using Them", incorporated by reference.

Preferably the modifiers and the dispersant are added to the mixer water prior to the addition of the hemihydrate. If both the modifier and the dispersant are in dry form, they can be pre-blended with each other and added with the stucco. This sequence of addition yields more of a boost in efficacy of the dispersant. A method for adding dispersants and modifiers to a stucco composition is disclosed in more detail in US 2006-0280898 A1, entitled "Modifiers for Gypsum Slurries and Method of Using Them", incorporated by reference.

Additional additives are also added to the slurry as are typical for the particular application to which the gypsum slurry will be put. Set retarders (up to about 2 lb./MSF (9.8 g/m$^2$)) or dry accelerators (up to about 35 lb./MSF (170 g/m$^2$)) are added to modify the rate at which the hydration reactions take place. Calcium Sulfate Accelerator ("CSA") is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

The gypsum slurry may include additives to modify one or more properties of the final product. Additives are used in the manner and amounts as are known in the art. Concentrations are reported in amounts per 1000 square feet of finished board panels ("MSF"). Starches are used in amounts from about 3 to about 20 lbs./MSF (14.6 to 97.6 g/m$^2$) to increase the paper bond and strengthen the product. Glass fibers are optionally added to the slurry in amounts of at least 11 lb./MSF (54 g/m$^2$). Up to 15 lb./MSF (73.2 g/m$^2$) of paper fibers are also added to the slurry. Wax emulsions are added to the gypsum slurry in amounts up to 90 lb./MSF (0.4 kg/m$^2$) to improve the water-resistance of the finished gypsum board panel.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g., soap. Foams and a preferred method for preparing foamed gypsum products are disclosed in U.S. Pat. No. 5,683,635, herein incorporated by reference. If foam is added to the product, the polycarboxylate dispersant and/or polynaphthalene sulfonate (if employed) is optionally divided between the gauge water and the foam water or two different dispersants are used in the gauge water and the foam water prior to its addition to the calcium sulfate hemihydrate. This method is disclosed in US published patent application 2006-0278128 A1, entitled, "Effective Use of Dispersants in Wallboard Containing Foam", incorporated by reference.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm.

In addition, the gypsum composition optionally can include a starch, such as a pregelatinized starch or an acid modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Other known additives may be used as needed to modify specific properties of the product. Sugars, such as dextrose, are used to improve the paper bond at the ends of the boards. Wax emulsions or polysiloxanes are used for water resistance. If stiffness is needed, boric acid is commonly added. Fire retardancy can be improved by the addition of vermiculite. These and other known additives are useful in the present slurry and wallboard formulations.

The solids of the slurry of the present invention preferably has less than 5 wt % calcium carbonate.

The slurry preferably has an absence of 2-phosphonobutane-1,2,4-tricarboxylic acid.

The slurry preferably has an absence of each of the monomers hydroxyalkyl acrylate phosphate, hydroxyalkylacrylamide phosphate, di(hydroxyalkyl acrylate) phosphate, and di(hydroxyalkylacrylamide) phosphate. The slurry preferably has an absence of polyalkylene glycol-containing macromonomer comprising an alkene group.

Preferably, the gypsum slurry has 5 to 70 volume percent air, more preferably 10 to 70 volume percent air, most preferably 20 to 70 volume percent air.

Gypsum Board and Method of Making

Preferably the method and composition of the invention are for preparing gypsum board 10 (see FIG. 1) comprising a core of set gypsum-containing material sandwiched between cover sheets, and linear polycarboxylates are employed in the concentrations and manner described above. In other respects, the composition and method can be practiced with the same components and in the same manner as the corresponding compositions and methods for preparing gypsum board of the prior art, for example, as described in U.S. Pat. Nos. 4,009,062 and 2,985,219, the disclosures of which are incorporated herein by reference.

Thus, the invention provides a gypsum board comprising: a gypsum core material comprising calcium sulfate dihydrate and a linear polycarboxylate dispersant of the present invention,
  wherein a hydraulic component of a slurry from which the gypsum core material was made comprised at least 50% calcium sulfate hemihydrate by weight based on the dry weight of the hydraulic component;
  wherein the slurry from which the gypsum core material was made has a water to calcium sulfate hemihydrate weight ratio of 0.2-1.5:1, preferably 0.2-0.8:1, more preferably 0.4-0.7:1;
  wherein the gypsum core material comprises 10 to 90 volume percent voids.

The gypsum board (also known as a gypsum panel) of the invention comprises a gypsum core material comprising calcium sulfate dihydrate and the linear polycarboxylate dispersant of the present invention consisting essentially of the first repeating unit A and the second repeating unit B, the gypsum board made from a gypsum slurry comprising the linear polycarboxylate dispersant and a hydraulic component comprising at least 50% calcium sulfate hemihydrate by weight based on the dry weight of the hydraulic component. Generally the board 10 (FIG. 1) has a thickness T of 0.25 to 1 inch.

In cases where it is desired to produce a gypsum board of lighter weight, the slurry of the invention further comprises aqueous foam of air bubbles. Such composition and method provide a board of lighter weight, because the bubbles of aqueous foam result in corresponding air voids in the set gypsum core of the resultant board.

The gypsum board comprises voids formed by foam of air bubbles in the gypsum slurry from which the gypsum core of the board was made. Preferably, the gypsum slurry has 5 to 70 volume percent air bubbles, more preferably 10 to 70 volume percent air, most preferably 20 to 60 volume percent air. The gypsum board may have a higher volume percent of voids than the slurry from which is made has a volume of bubbles. This is because additional voids (water voids) result from spaces between particles when water is removed as the slurry sets to form the board. Thus, the gypsum board may have a total void volume of 10 to 92 volume percent, more preferably 25 to 90 volume percent, most preferably 30 to 85 volume percent. If air is added in the method of the invention the calcium sulfate hemihydrate and water are mixed to form the slurry and then the air is added by entraining air into the slurry and/or by adding foam water to the slurry.

A method of the present invention produces the above described gypsum board comprising the core of set gypsum sandwiched between cover sheets of paper or other material. Preferably the board is prepared by forming a flowable mixture (slurry) of calcined gypsum (calcium sulfate hemihydrate), air, water, and linear polycarboxylate dispersant, depositing it between cover sheets, and allowing the resultant assembly to set and dry. The slurry is deposited onto a first cover sheet then a second cover sheet is applied over the setting slurry.

The slurry preferably sets at least 50% in 10 minutes in the absence of accelerators. Thus, the board is at least 50% set in 10 minutes in the absence of accelerators.

The slurry comprises the linear polycarboxylate dispersant and hydraulic component comprising at least 50% calcium sulfate hemihydrate by weight, preferably at least 80% calcium sulfate hemihydrate by weight, based on the dry weight of the hydraulic component and the slurry is made into a gypsum core material of a gypsum board (also known as a gypsum panel). The gypsum slurry from which the gypsum board was made has a water to calcium sulfate hemihydrate weight ratio of 0.1-1.5:1, preferably 0.2-0.8:1, more preferably 0.4-0.8:1.

The slurry is made from gypsum (calcium sulfate hemihydrate), water and the dispersant of the present invention. In operation, to make the slurry for the board the gypsum is moved on a conveyor toward a mixer. Prior to entry into the mixer, dry additives, such as dry set accelerators, are added to the powdered gypsum. Water is also added. Air is also added. Some additives are added directly to the mixer via a separate line. Other additives may also be added to the water. This is particularly convenient where the additives are in liquid form. For most additives, there is no criticality regarding placing the additives in the slurry, and they may be added using whatever equipment or method is convenient.

However, when using the dispersant of this invention, it is important to add the dispersant to the water prior to addition of the stucco. Gauge water or make-up water is added at the mixer in amounts needed to meet the target water to stucco ratio when water from other sources has been considered. The gypsum (calcium sulfate hemihydrate) converts to calcium sulfate dihydrate during production of the board.

In preferred methods and compositions for preparing gypsum board the front and back surface sheets of the board comprise paper, and a trimetaphosphate ion is typically also employed in the slurry for the core composition. Thus, preferably the slurry for the core composition also includes trimetaphosphate ion. In preferred methods and compositions for preparing gypsum board, wherein the surface sheets of the board comprise paper, preferably the slurry also includes a pregelatinized starch in the production slurry. This starch then becomes distributed throughout the resultant gypsum core. This avoids the weakening of the bonding between the core and the cover sheets. The pregelatinized starch avoids the otherwise slightly increased risk of paper delamination under conditions of extreme moisture. Pregelatinizing of raw starch is achieved by cooking in water at temperatures of at least 185° F. or by other well-known methods Thus, in a preferred composition and method for producing a gypsum board, the composition comprises a mixture of calcined gypsum (calcium sulfate hemihydrate), water, linear polycarboxylate dispersant, trimetaphosphate ion, and a pregelatinized starch. The method comprises forming such a mixture, depositing it on a first cover sheet to form a gypsum core, and then applying a second cover sheet over the gypsum core. The mixture is then maintained under conditions sufficient for the calcium sulfate material to form a set gypsum material.

Some examples of readily available pregelatinized starches that serve the purposes of the present invention are (identified by their commercial names): PCF1000 starch, available from Lauhoff Grain Co.; and AMERIKOR 818 and HQM PREGEL starches, both available from Archer Daniels Midland Co.

To be used in a preferred practice of the invention, the pregelatinized starch is included in the aqueous mixture of calcined gypsum at a concentration of from about 0.08 to about 5 percent by weight, based on the weight of the calcined gypsum. A preferred concentration of pregelatinized starch is from about 0.2 to about 3 percent. If the corresponding embodiment of the prior art also contains a starch that has not been pregelatinized (as many do), the pregelatinized starch in the inventive embodiment can also serve to replace all or a portion of the amount of that prior art starch normally employed.

Foaming Agent

In embodiments of the invention that employ a foaming agent to yield voids in the set gypsum-containing product to provide lighter weight, any of the conventional foaming agents known to be useful in preparing foamed set gypsum products can be employed. A preferred range of foaming agent is from about 0.2 lb/MSF to about 1.5 lb/MSF. Many such foaming agents are well known and readily available commercially, e.g., soap. For further descriptions of useful foaming agents, see, for example: U.S. Pat. Nos. 4,676,835; 5,158,612; 5,240,639 and 5,643,510; and PCT International Application Publication WO 95116515, published Jun. 22, 1995.

In many cases it will be preferred to form relatively large voids in the gypsum product, to help maintain its strength. This can be accomplished by employing a foaming agent that generates foam that is relatively unstable when in contact with calcined gypsum slurry. Preferably, this is accomplished by blending a major amount of foaming agent known to generate relatively unstable foam, with a minor amount of foaming agent known to generate relatively stable foam.

Such a foaming agent mixture can be pre-blended "off-line", i.e., separate from the process of preparing foamed gypsum product. However, it is preferable to blend such foaming agents concurrently and continuously, as an integral "on-line" part of the process. This can be accomplished, for example, by pumping separate streams of the different foaming agents and bringing the streams together at, or just prior to, the foam generator that is employed to generate the stream of aqueous foam which is then inserted into and mixed with the calcined gypsum slurry. By blending in this manner, the ratio of foaming agents in the blend can be simply and efficiently adjusted (for example, by changing the flow rate of one or both of the separate streams) to achieve the desired void characteristics in the foamed set gypsum product. Such adjustment will be made in response to an examination of the final product to determine whether such adjustment is needed. Further description of such "on-line" blending and adjusting can be found in U.S. Pat. No. 5,643,510, and in U.S. Pat. No. 5,683,635.

An example of one type of foaming agent, useful to generate unstable foams, has the formula $ROSO_3^-M^+$, wherein R is an alkyl group containing from 2 to 20 carbon atoms, and M is a cation. Preferably, R is an alkyl group containing from 8 to 12 carbon atoms. An example of one type of foaming agent, useful to generate stable foams, has the formula $CH_3(CH_2)_xCH_2(OCH_2CH_2)yOSO_3^-M^+$, wherein X is a number from 2 to 20, Y is a number from 0 to 10 and is greater than 0 in at least 50 weight percent of the foaming agent, and M is a cation. Blends of these foaming agents may also be employed.

In some preferred embodiments of the invention, the aqueous foam has been generated from a pre-blended foaming agent having the formula $CH_3(CH_2)_xCH_2(OCH_2CH_2)yOSO_3^-M^+$, wherein X is a number from 2 to 20, Y is a number from 0 to 10 and is 0 in at least 50 weight percent of the foaming agent, and M is a cation. Preferably, Y is 0 in from 86 to 99 weight percent of this foaming agent.

Composite Boards

In cases where it is desired to produce a composite gypsum board, the slurry of the invention further comprises reinforcing material. The composite board comprises set gypsum and host particles, at least a portion of the set gypsum being positioned in and about accessible voids in the host particles. The board is prepared by forming or depositing a mixture on a surface, wherein the mixture comprises: the host particles; calcium sulfate hemihydrate, at least a portion of which is in the form of crystals in and about the voids of the host particles, water, and linear polycarboxylate dispersant. Preferably the mixture also contains an appropriate amount of one or more enhancing materials chosen from the group consisting of condensed phosphoric acids, each of which comprises two or more phosphoric acid units; and salts or ions of condensed phosphates, each of which comprises 2 or more phosphate units. The mixture is then maintained under conditions sufficient for the calcium sulfate hemihydrate to form set gypsum, whereby the portion of the set gypsum in and about the accessible voids in the host particles forms by in situ hydration of the calcium sulfate hemihydrate crystals in and about the voids of the host particles.

In some preferred inventive embodiments wherein the method and composition are for preparing a composite board comprising set gypsum and particles of a reinforcing material in the concentrations and manner described above.

Preferably, trimetaphosphate ion is also employed in the concentrations and manner described above. If desired the composite product comprises set gypsum and host particles, at least a portion of the set gypsum being positioned in and about accessible voids in the host particles. The inventive composition comprises a mixture of: host particles having accessible voids therein; calcined gypsum, at least a portion of which is in the form of crystals in and about the voids in the host particles; and linear polycarboxylate dispersant. Preferably the mixture also includes a water-soluble trimetaphosphate salt. The composition can be mixed with water to produce an inventive mixture of water, linear polycarboxylate dispersant, host particles having accessible voids therein, calcined gypsum (at least a portion of which is in the form of crystals in and about the voids in the host particles), and preferably trimetaphosphate ion. The method comprises forming such a mixture, depositing it on a surface or into a mold, and allowing it to set and dry. In other respects, the composition and method can be practiced with the same components and in the same manner as the corresponding compositions and methods for preparing composite board of the prior art, for example, as described in U.S. Pat. No. 5,320,677, the disclosure of which is incorporated herein by reference.

Other Products Made from the Slurry of the Present Invention

The invention also provides a set gypsum-containing machinable product prepared by forming a mixture comprising a starch, particles of a water-redispersible polymer, a calcium sulfate material, water, and linear polycarboxylate dispersant. Preferably the mixture also contains an appropriate amount of one or more enhancing materials chosen from: condensed phosphoric acids, each of which comprises 2 or more phosphoric acid units; and salts or ions of condensed phosphates, each of which comprises two or more phosphate units. The mixture is then maintained under conditions sufficient for the calcium sulfate material to form a set gypsum material.

The invention also provides a set gypsum-containing product employed to finish a joint between edges of gypsum boards, the product prepared by inserting into the joint a mixture comprising a binder, a thickener, a non-leveling agent a calcium sulfate material, water, and linear polycarboxylate dispersant. Preferably the mixture also contains an appropriate amount of one or more enhancing materials chosen from condensed phosphoric adds, each of which comprises 2 or more phosphoric acid units; and salts or ions of condensed phosphates, each of which comprises 2 or more phosphate units. The mixture is then maintained under conditions sufficient for the calcium sulfate material to form a set gypsum material.

The method and composition may produce a material employed to finish a joint between edges of gypsum boards, wherein the linear polycarboxylate dispersant and employed in the concentrations described above. Preferably trimetaphosphate salts and ions are also included in the composition. In respect to aspects other than the inclusion of linear polycarboxylate dispersant the composition and method can be practiced with the same components and in the same manner as the corresponding compositions and methods for producing a joint finishing material in the prior art, for example, as described in U.S. Pat. No. 3,297,601, the disclosure of which is incorporated herein by reference. In some preferred forms the composition comprises a mixture of calcined gypsum, linear polycarboxylate dispersant, a binder, a thickener, and a non-leveling agent, and preferably a water-soluble trimetaphosphate salt. The composition can be mixed with water to produce an inventive mixture of calcined gypsum, linear polycarboxylate dispersant, binder, thickener, non-leveling agent, and preferably trimetaphosphate ion. The method comprises forming such a mixture, inserting it into a joint between edges of gypsum boards, and allowing it to set and dry.

In such preferred joint finishing embodiments the binder, thickener, and non-leveling agent are chosen from the components well known to those skilled in the joint compound art. For example, the binder can be a conventional latex binder, with poly(vinyl acetate) and poly(ethylene-co-vinyl acetate) being preferred and being included in a range of from about 1 to about 15 percent by weight of the composition. An example of a useful thickener is a cellulosic thickener, e.g., ethylhydroxy ethylcellulose, hydroxypropyl methylcellulose, methylhydroxypropyl cellulose, or hydroxyethyl cellulose, included in a range of from about 0.1 to about 2 percent by weight of the composition. Examples of suitable non-leveling agents are attapulgite, sepiolite, bentonite, and montmorillonite clays, included in a range of from about 1 to about 10 percent by weight of the composition.

The following examples are presented to further illustrate some preferred embodiments of the invention and to compare them with methods and compositions outside the scope of the invention. Unless otherwise indicated, concentrations of materials in compositions and mixtures are given in percent by weight based upon the weight of calcined gypsum present.

Example 1

New linear polycarboxylates were compared against Polynaphthalene sulfonate at the same dosage. Water usage was adjusted to achieve a 7 inch slump (Water to Stucco weight Ratio, WSR).

The linear polycarboxylate anionic dispersants were synthesized by radical polymerization in aqueous media, using a radical initiator (inorganic peroxide) and standard change transfer agent (mercaptan). Typically a polydispersity above 2.0 is obtained and the polymer end groups are theorized to be a mixture of inactivated versions of the initiator, chain transfer agent, and monomeric units.

Water demand of gypsum slurries dispersed with Linear Polycarboxylate dispersants (PC1-PC8 made by Ruetgers Polymers) was tested and compared with Polynaphthalene sulfonate (DURASAR Polynaphthalene sulfonate calcium salt available from Ruetgers Polymers) dispersed gypsum slurries. Synthetic beta calcium hemihydrate with 1% wt (of stucco weight) of Ball Mill Accelerator and 3% wt pregelled starch added was mixed with water, dispersant and retarder in a high shear blender for 10 seconds. The slurry was poured into a metal cylinder and let to spread after lifting the cylinder. The diameter of the slurry spread was measured.

To compare the efficacy of the dispersants, the dispersant dosage was set to 0.25% wt (of stucco weight) and the water dosage was adjusted to achieve a consistent 7 inch (18 cm) slurry spread. Retarder (VERSENEX 80) dosage was adjusted to achieve comparable stiffening time of the slurry within 40-60 seconds. Water demand is expressed as Water to Stucco weight Ratio (WSR) required for the 7 inch spread.

The linear polycarboxylate dispersants tested are listed on TABLE 1.

TABLE 1

| Linear Carboxylate Dispersant Copolymer Sample | Monomers for Making the Linear Carboxylate Dispersant Copolymer | Carboxylic monomer content (Monomer A) (mol %) | WSR | $MW_w$ |
|---|---|---|---|---|
| PC1 | copolymer of MAA (a carboxylic monomer used to make first monomeric repeating unit A) with sodium and 2-Acrylamido-2-methyl-1-propane sodium sulfonate (a vinyl sulfonate monomer used to make second monomeric repeating unit B) 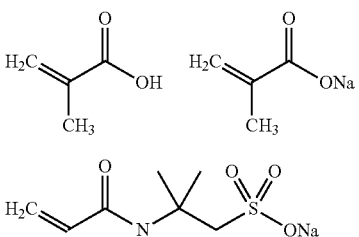 | 67% | 0.754 | 12000 |
| PC2 | copolymer of MAA with sodium and 2-Acrylamido-2-methyl-1-propane sodium sulfonate 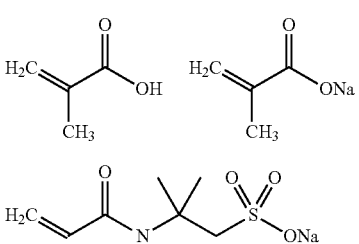 | 50% | 0.772 | 9000 |
| PC3 | copolymer of MAA and 3-sulfopropyl methacrylate potassium salt 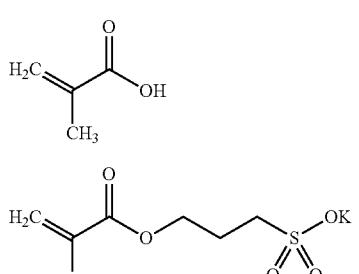 | 80% | 0.754 | 16000 |

TABLE 1-continued

| Linear Carboxylate Dispersant Copolymer Sample | Monomers for Making the Linear Carboxylate Dispersant Copolymer | Carboxylic monomer content (Monomer A) (mol %) | WSR | MW$_w$ |
|---|---|---|---|---|
| PC4 | copolymer of MAA and 3-sulfopropyl methacrylate potassium salt | 80% | 0.754 | 14000 |

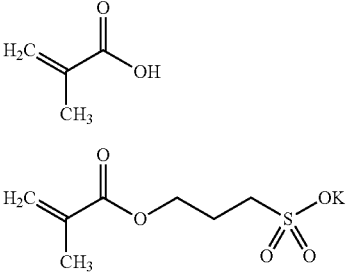

| PC5 | copolymer of MAA with sodium and 2-Acrylamido-2-methyl-1-propane sodium sulfonate | 11% | 0.792 | 12000 |

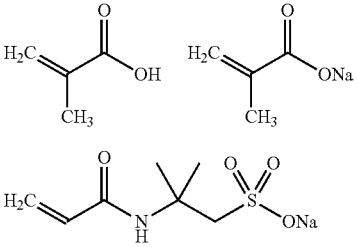

| PC6 | copolymer of Itaconic acid and 2-Acrylamido-2-methyl-1-propane sodium sulfonate | 11% | 0.787 | 17000 |

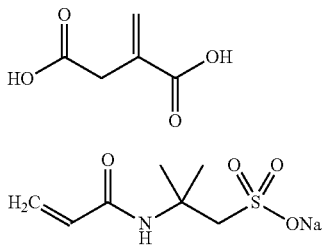

| PC7 | copolymer of Itaconic acid and 2-Acrylamido-2-methyl-1-propane sodium sulfonate | 20% | 0.772 | 17000 |

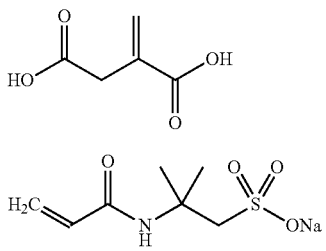

TABLE 1-continued

| Linear Carboxylate Dispersant Copolymer Sample | Monomers for Making the Linear Carboxylate Dispersant Copolymer | Carboxylic monomer content (Monomer A) (mol %) | WSR | $MW_w$ |
| --- | --- | --- | --- | --- |
| PC8 | copolymer of MAA with sodium and 2-Acrylamido-2-methyl-1-propane sodium sulfonate | 80% | 0.761 | 12000 |

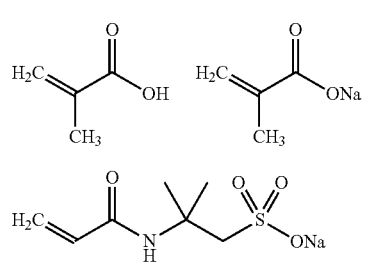

The results of this Example are shown by TABLE 2.

TABLE 2

| | DURASAR | New Linear Polycarboxylates | | | | | | | |
| --- | --- | --- | --- | --- | --- | --- | --- | --- | --- |
| Dispersant | PNS | PC3 | PC4 | PC1 | PC2 | PC5 | PC6 | PC7 | PC8 |
| Dispersant dosage (% based upon weight stucco) | 0.25 | 0.25 | 0.25 | 0.25 | 0.25 | 0.25 | 0.25 | 0.25 | 0.25 |
| Retarder dosage (% based upon weight stucco) | 0.0375 | 0.0425 | 0.0425 | 0.045 | 0.05 | 0.0525 | 0.0475 | 0.045 | 0.04 |
| WSR * | 0.85 | 0.754 | 0.754 | 0.754 | 0.772 | 0.792 | 0.787 | 0.772 | 0.761 |

*water to stucco ratio ("WSR")

All Linear polycarboxylates tested achieved a lower water demand (WSR) than DURASAR Polynaphthalene sulfonate (PNS). Water demand and retarder use are reduced with the increase of Monomer A content. All linear polycarboxylate dispersants achieved a lower WSR than commercially available PNS dispersant.

Example 2

New linear polycarboxylates were compared against Polynaphthalene sulfonate and conventional branched polycarboxylate (also known as a polycarboxylate ether or PCE) at the same dosage using a more challenging stucco containing clays. Water usage was adjusted to achieve a 7 inch slump (Water to Stucco weight Ratio, WSR). The stucco has 87 wt % Calcium sulfate hemihydrate, and about 0.6 wt % total clay.

The linear polycarboxylate anionic dispersants were synthesized by radical polymerization in aqueous media, using a radical initiator (inorganic peroxide) and standard change transfer agent (mercaptan). Typically a polydispersity above 2.0 is obtained and the polymer end groups are theorized to be a mixture of inactivated versions of the initiator, chain transfer agent, and monomeric units.

Water demand of gypsum slurries dispersed with Linear Polycarboxylate dispersants (PC1, PC4 and PC7 made by Ruetgers Polymers) was tested and compared with Polynaphthalene sulfonate (DURASAR Polynaphthalene sulfonate calcium salt available from Ruetgers Polymers) and conventional PCE (ETHACRYL M, available from COATEX) dispersed gypsum slurries. Natural gypsum containing beta calcium hemihydrate with 0.75% wt (of stucco weight) of Ball Mill Accelerator and 3% wt pre-gelled starch added was mixed with water, dispersant and retarder in a high shear blender for 10 seconds. The slurry was poured into a metal cylinder and let to spread after lifting the cylinder. The diameter of the slurry spread was measured.

To compare the efficacy of the dispersants, the dispersant dosage was set to 0.25% wt (of stucco weight) and the water dosage was adjusted to achieve a consistent 7 inch (18 cm) slurry spread. Retarder (VERSENEX 80) dosage was adjusted to achieve comparable stiffening time of the slurry within 40-60 seconds. Water demand is expressed as Water to Stucco weight Ratio (WSR) required for the 7 inch spread. The linear polycarboxylate dispersants tested are listed on TABLE 3.

TABLE 3

| Dispersant | WSR |
| --- | --- |
| PC1 | 0.97 |
| PC4 | 0.97 |
| PC7 | 0.975 |

TABLE 3-continued

| Dispersant | WSR |
|---|---|
| DURASAR polynaphthalene sulfonate calcium salt | 1.005 |
| COATEX ETHACRYL M polycarboxylate ether | 0.99 |

Clay containing stuccos are very difficult to disperse using conventional dispersants and the otherwise very effective conventional PCE cannot reduce the water demand of these challenging stuccos. Linear polycarcoxylate dispersants performed better than PNS and even PCE.

Example 3

A blend of the linear polycarboxylate of the present invention with Polynaphthalene sulfonate (PNS) was compared against linear polycarboxylate and was compared against Polynaphthalene sulfonate at the same dosage. Water usage was adjusted to achieve a 6 inch slump (Water to Stucco weight Ratio, WSR).

The linear polycarboxylate anionic dispersant was synthesized by radical polymerization in aqueous media, using a radical initiator (inorganic peroxide) and standard change transfer agent (mercaptan). Typically a polydispersity above 2.0 is obtained and the polymer end groups are theorized to be a mixture of inactivated versions of the initiator, chain transfer agent, and monomeric units.

The linear polycarboxylate dispersant had a 60:40 molar ratio of MAA and AMPS and a wt, average molecular weight estimated to be around 15000 Daltons.

Water demand of gypsum slurries dispersed with Linear Polycarboxylate dispersant made by Ruetgers Polymers was tested and compared with Polynaphthalene sulfonate (DURASAR Polynaphthalene sulfonate calcium salt available from Ruetgers Polymers) and with a 1:1 blend of Linear Polycarboxylate of the present invention and PNS (DURASAR) dispersed gypsum slurries. Synthetic beta calcium hemihydrate with 1% wt (of stucco weight) of Ball Mill Accelerator and 2% wt pre-gelled starch added was mixed with water, dispersant and retarder in a high shear blender for 10 seconds. The slurry was poured into a metal cylinder and let to spread after lifting the cylinder. The diameter of the slurry spread was measured.

To compare the efficacy of the dispersants, the dispersant dosage was set to 0.64% wt (of stucco weight) and the water dosage was adjusted to achieve a consistent 6 inch (15 cm) slurry spread. Retarder (VERSENEX 80) dosage was adjusted to achieve comparable stiffening time of the slurry within 40-60 seconds. Water demand is expressed as Water to Stucco weight Ratio (WSR) required for the 6 inch spread. The linear polycarboxylate dispersants tested are listed on TABLE 4.

TABLE 4

| Dispersant | WSR | Slump (inches) |
|---|---|---|
| Linear polycarboxylate | 0.747 | 6 |
| DURASAR (PNS) | 0.80 | 5.5 |
| Linear polycarboxylate & DURASAR Blend 1:1 weight ratio | 0.729 | 6.25 |

Linear PC dispersants were found to be equally or more effective when used simultaneously with Polynaphthalene sulfonates.

Example 4

Hydration Data

Figure 2:
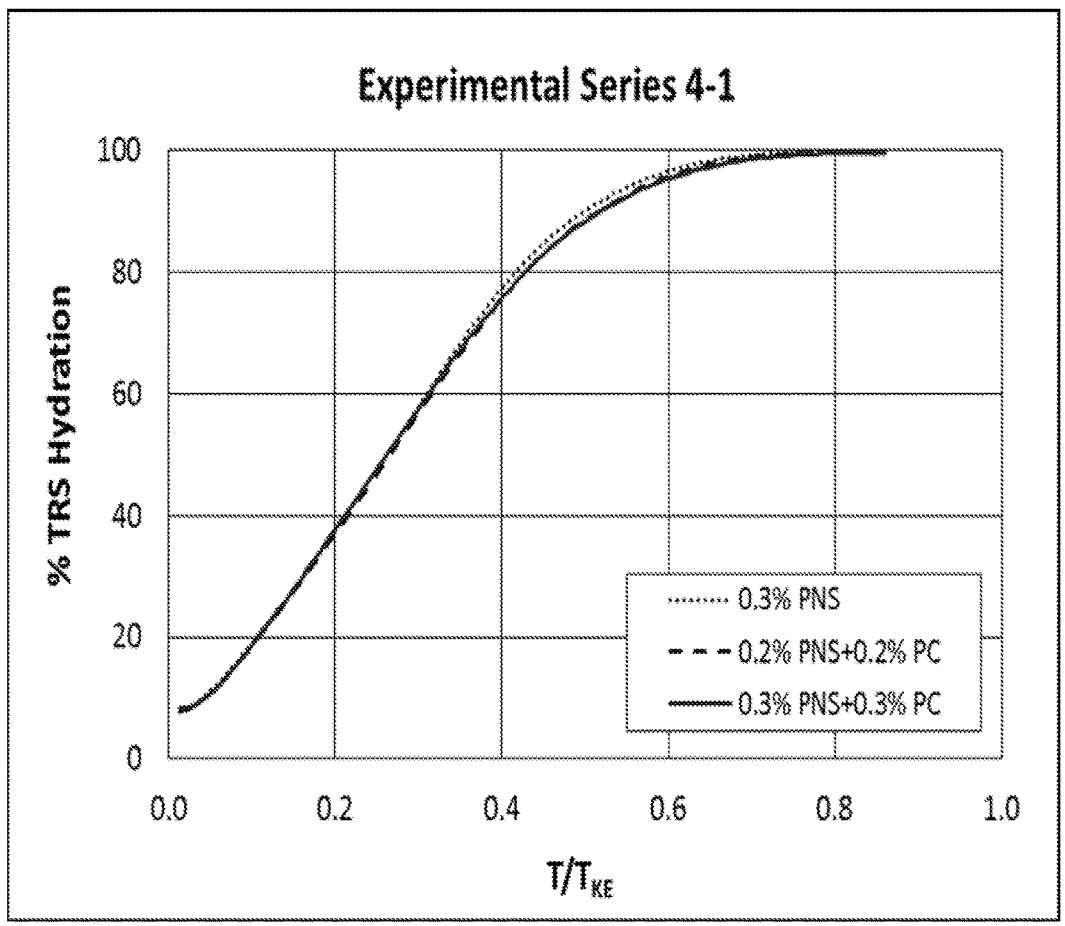
FIG. 2 shows hydration data for Example 4, Experimental Series 4-1.
Figure 3:
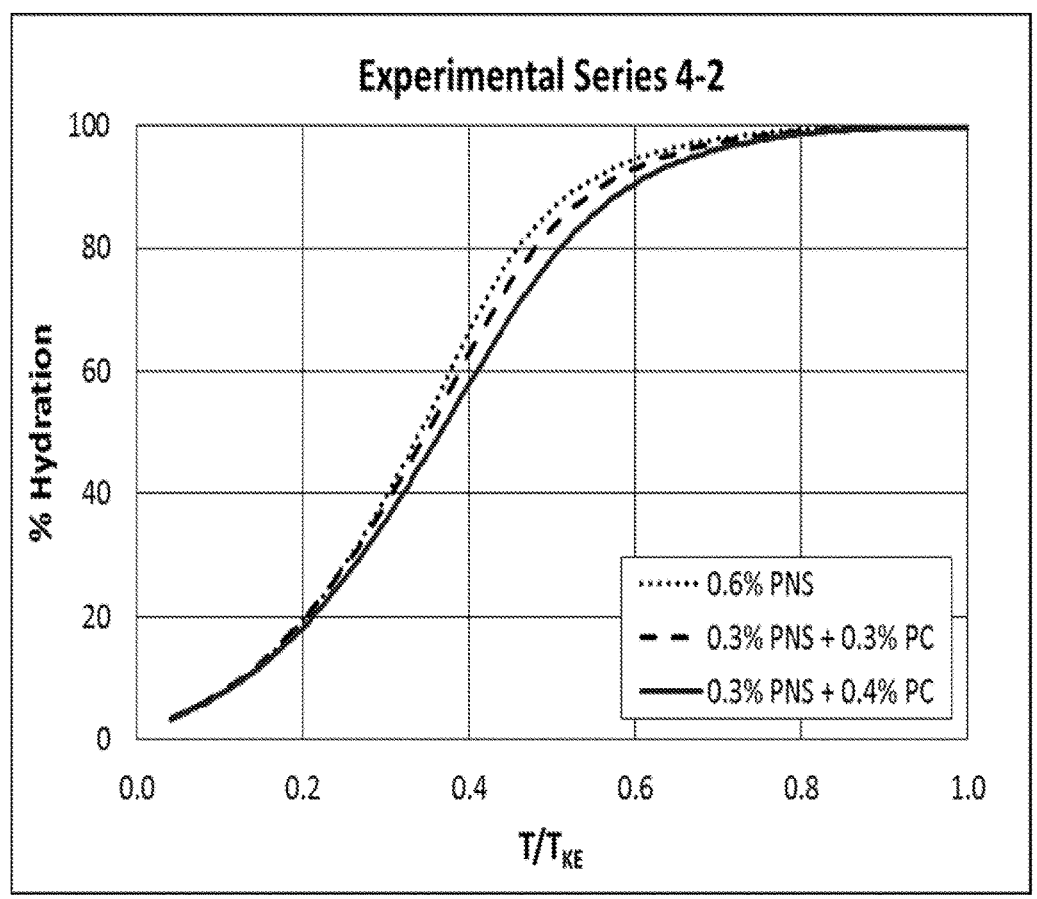
FIG. 3 shows hydration data for Example 4, Experimental Series 4-2.
Figure 4:
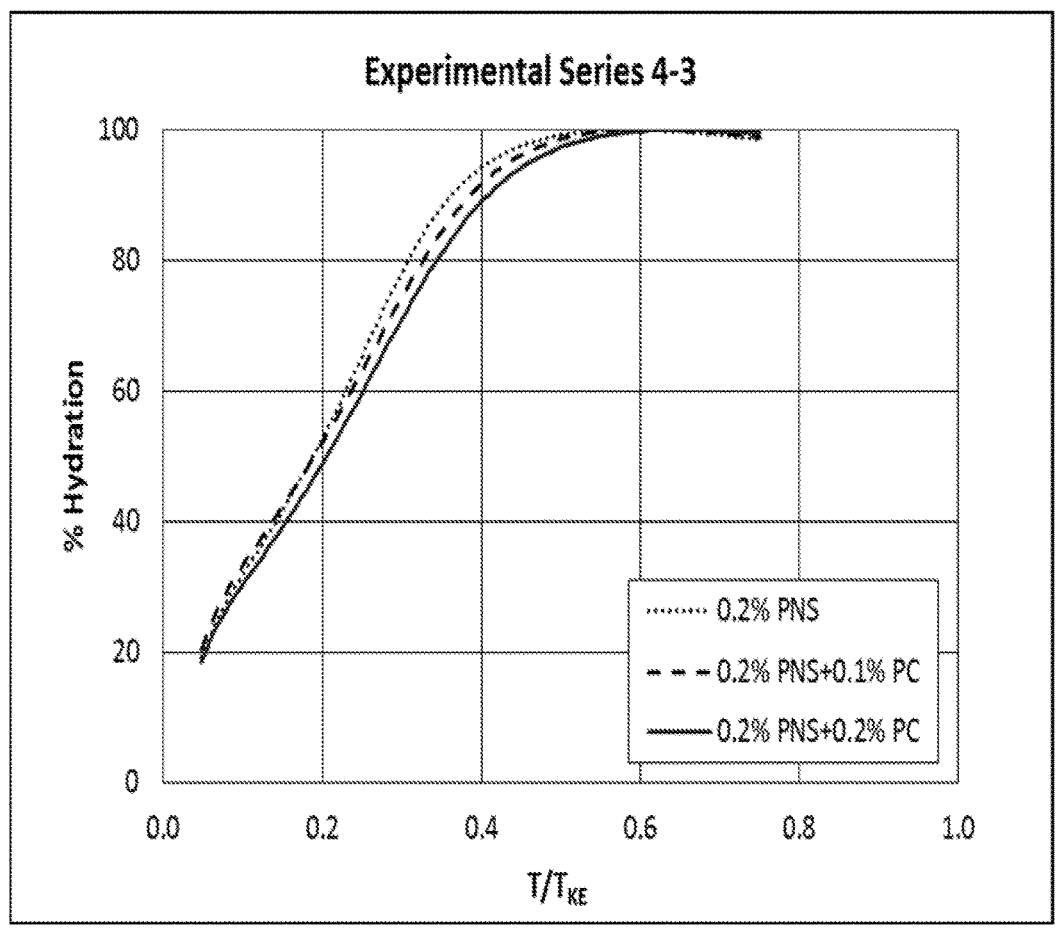
FIG. 4 shows hydration data for Example 4, Experimental Series 4-3.

In Experimental Series 4-1, Experimental Series 4-2, and Experimental Series 4-3, methacrylic acid based linear polycarboxylate was tested as a dispersant for gypsum board and the hydration measured as Temperature Rise was recorded. The hydration data from Experimental Series 4-1 is shown by FIG. 2, Experimental Series 4-2 is shown by FIG. 3, and Experimental Series 4-3 is shown by FIG. 4.

Experimental Series 4-1 tested compositions in which the dispersant was 0.3 wt. % PNS (polynaphthalene sulfonate), a mixture of 0.2 wt. % PNS (polynaphthalene sulfonate) and 0.2 wt. % linear polycarboxylate dispersant of the present invention, and a mixture of 0.3 wt. % PNS (polynaphthalene sulfonate) and 0.3 wt. % linear polycarboxylate dispersant of the present invention.

Experimental Series 4-2 tested compositions in which the dispersant was 0.6 wt. % PNS (polynaphthalene sulfonate), a mixture of 0.3 wt. % PNS (polynaphthalene sulfonate) and 0.3 wt. % linear polycarboxylate dispersant of the present invention, and a mixture of 0.3 wt. % PNS (polynaphthalene sulfonate) and 0.4 wt. % linear polycarboxylate dispersant of the present invention.

Experimental Series 4-3 tested compositions in which the dispersant was 0.2 wt. % PNS (polynaphthalene sulfonate), a mixture of 0.2 wt. % PNS (polynaphthalene sulfonate) and 0.1 wt. % linear polycarboxylate dispersant of the present invention, and a mixture of 0.2 wt. % PNS (polynaphthalene sulfonate) and 0.2 wt. % linear polycarboxylate dispersant of the present invention.

The linear polycarboxylate dispersant was a copolymer of MAA and AMPS having a wt. average molecular weight estimated to be around 16000 Daltons.

All samples of slurry were taken from a plant size gypsum board manufacturing line and tested for hydration. A mixer of a gypsum board manufacturing line was used to combine wet and dry ingredients to form a core slurry in a continuous process. The core slurry from a discharge conduit of the mixer was deposited as a continuous ribbon of board precursor on a sheet of paper. The samples were taken from this continuous ribbon of board precursor and then tested.

In each Experimental Series, the only formulation change was the dispersant type and dosage amount. Retarder and accelerator dosage was not adjusted.

Gypsum slurries in FIG. 2 Experimental Series 4-1 did not show any signs of delayed hydration when linear polycarboxylates (PC) were introduced. In the plots of FIGS. 2-4, T represents time and $T_{KE}$ represents time to kiln entrance.

Gypsum slurries in Experimental Series 4-2 showed a minor delay of hydration with 0.3% wt dosage of linear polycarboxylate. The impact was more visible when the dosage was further increased to 0.4% wt. However, in both cases, the hydration was complete before 0.75 $T/T_{KE}$, where T is the time and $T_{KE}$ is the time for the board formed at the mixer to the kiln entrance.

Gypsum slurries in Experimental Series 4-3 showed a minor decrease of hydration with 0.1% PC added and the decrease was slightly increased for 0.2% wt. Similarly, as in Experimental Series 4-2, the overall hydration was not reduced and the hydration was complete before 0.5 $T/T_{KE}$.

The retardation effect of the linear polycarboxylates was found to be either minor or non-existent (Experimental Series 4-1) and it did not impact the overall time to 100% hydration.

Linear Polycarboxylates (from this invention) only impact the initial part of the hydration and can be considered acting like a weak retarder with fading retardation.

Compared to conventional branched polycarboxylate dispersants. The impact of Linear polycarboxylates described in this invention is minimal or non-existent to product strength. This is a significant unexpected advantage. As a result of the minimal or non-existent retardation effect, the retardation can be accurately controlled by adding dedicated retarding agents without interference from the Linear Polycarboxylate dispersants.

Conventional branched polycarboxylates have a stronger and persistent retardation impact at a high usage, resulting in hydration less than 100% at $T_{KE}$ and thereby, reduced strength properties. For example U.S. Pat. No. 7,070,648 to Schwartz et al. at Column 1, lines 45-50 disclosed recently, acrylic-polyether comb-branched copolymers are used as water reducing agents in gypsum compositions (referring to U.S. Pat. No. 6,527,850 to Schwartz et al.). The comb-branched copolymers can be used in much lower dosages than polynaphthalene sulfonate. However, the comb-branched copolymers tend to retard the setting.

Example 5

Comparing Methacrylic Acid Based Polymer With Comparative Acrylic Acid Based Polymer Methacrylic acid based linear polycarboxylate PC1 was compared against Linear Polycarboxylates made with Acrylic Acid at the same dosage.

The linear polycarboxylate anionic dispersants were synthesized by radical polymerization in aqueous media, using a radical initiator (inorganic peroxide) and standard change transfer agent (mercaptan). Typically, a polydispersity above 2.0 is obtained and the polymer end groups are theorized to be a mixture of inactivated versions of the initiator, chain transfer agent, and monomeric units.

The Acrylic Acid based linear polycarboxylate dispersants tested are listed on TABLE 5.

TABLE 5

| Comparative Linear Carboxylate Dispersant Copolymer Sample | Monomers for Making the Linear Carboxylate Dispersant Copolymer | Carboxylic monomer content (Monomer A) mol % | MWw |
|---|---|---|---|
| PC-A | Copolymer of AA (Acrylic Acid) with 2-Acrylamido-2-methyl-1-propane sodium sulfonate | 67% | 13000 |
| PC-B | Copolymer of AA (Acrylic Acid) with 2-Acrylamido-2-methyl-1-propane sodium sulfonate | 50% | 13000 |

Water demand of gypsum slurries dispersed with Linear Polycarboxylate dispersants (PC1, made by Ruetgers Polymers) was tested and compared with Acrylic Acid based Linear Polycarboxylate PC-A and PC-B, (made by Ruetgers Polymers) in dispersed gypsum slurries. Synthetic β calcium hemihydrate with 1% wt (of stucco weight) of Ball Mill Accelerator and 3% wt pre-gelled starch added was mixed with water, dispersant and retarder in a high shear blender for 10 seconds. The slurry was poured into a metal cylinder and let to spread after lifting the cylinder. The diameter of the slurry spread was measured. This is shown as the Examples with PC1, PC-A Run 1, and PC-B Run 2.

To compare the efficacy of the dispersants, the dispersant dosage was set to 0.25% wt (of stucco weight) and the water to stucco ratio was set to 83% to achieve slump around 7 inch (18 cm) slurry spread. Retarder (VERSENEX 80) dosage was adjusted to achieve comparable stiffening time of the slurry within 40-60 seconds. Stiffening times are reported for all tests. TABLE 6 shows the test results.

TABLE 6

| | Dispersant | | | | |
|---|---|---|---|---|---|
| | PC1 | PC-A Run 1 | PC-B Run 2 | PC-A Run 3* | PC-B Run 4* |
| Dispersant Dosage | 0.25% | 0.25% | 0.25% | 0.25% | 0.25% |
| Retarder Dosage | 0.0375% | 0.0375% | 0.0375% | 0.0025% | 0.0025% |
| Slump (inch) | 6.75 | 7.75 | 8 | 7.75 | 8 |
| Stiffening time (m:ss) | 0:47 | 2:27 | 3:12 | 0:58 | 1:05 |
| WSR | 83% | 83% | 83% | 83% | 83% |

*retarder dosage was greatly reduced

When the same formulation is used comparing PC1, PC-A Run 1, and PC-B-Run 2, the slurries made with PC-A and PC-B took significantly longer to achieve the same stiffness. The retardation caused by the Acrylic Acid based linear Polycarboxylates was significant and undesirable.

As a next step the retarder dosage was greatly reduced and the tests were repeated using the same water to stucco ratio. This is shown as the Examples with PC-A Run 3, and PC-B Run 4. Even at a very low retarder dosage the retardation caused by the Acrylic Acid based linear Polycarboxylates was still significant and undesirable. The slurry spread was slightly better, but it can be attributed to the longer stiffening time and delayed set from the dispersant. Acrylic acid based linear polycarboxylate polymers have therefore a limited use as dispersant due to the strong retardation effect on the gypsum set times. The methacrylic acid based linear polycarboxylate polymers are unexpectedly superior to the acrylic acid based linear polycarboxylate polymers because the methacrylic acid based linear polycarboxylate polymers do not have the detrimental retardation effect.

Linear Methacrylic Acid and Itaconic Acid based linear polycarboxylate polymers of the invention were not found to have a significant impact on set time or retarder use when used to disperse gypsum slurries (see Example 1).

The invention is not limited by the above provided embodiments but rather is defined by the claims appended hereto.

What is claimed is:

1. A gypsum board comprising:
   a gypsum core material comprising
      calcium sulfate dihydrate and
      a linear polycarboxylate anionic dispersant comprising a first monomeric repeating unit A and a second monomeric repeating unit B, and an absence of polyvinyl acetate monomeric units;
   wherein the first monomeric repeating unit A is at least one carboxylic acid functional group containing olefinic moiety of formula I:

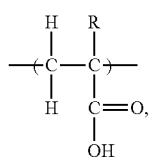

wherein R is selected from the group consisting of —CH$_3$, and —CH$_2$—C(O)—OH, or a Na, K, or NH$_4^+$ salt thereof, wherein linear polycarboxylate anionic dispersant has an absence of acrylic acid monomer; and wherein the second monomeric repeating unit B is at least one vinyl sulfonate according to formula II:

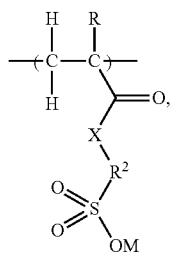

wherein X is NH or O; R$^1$ is H or —CH$_3$; R$^2$ is a linear or branched alkylene group having the formula —(C$_n$H$_{2n}$)—, wherein n=2 to 6; M=H, Na, K, or NH$_4^+$;

wherein the molar ratio of the first repeating unit A to the second repeating unit B is A is between 1:9 and 9:1;

wherein the weight average molecular weight of the linear polycarboxylate anionic dispersant is 3000 to 100000 Daltons;

wherein the gypsum core material has a total void volume of 10 to 92 volume percent, wherein the gypsum core material was made from a slurry comprising a mixture of the water, the linear polycarboxylate anionic dispersant, and a hydraulic component comprising hydraulic material, wherein the hydraulic material of the slurry comprises at least 80% calcium sulfate hemihydrate by weight based on the dry weight of the hydraulic component, wherein calcium sulfate anhydrite, synthetic gypsum or landplaster is less than 20% of the hydraulic material;

wherein weight ratio of water to calcium sulfate hemihydrate of the slurry from which the gypsum core material was 0.2-1.5:1;

wherein the board comprises the gypsum core sandwiched between cover sheets, wherein the dispersant is present in the slurry in an amount of from about 0.01% to about 2% by weight of the dry dispersant calculated as a percentage of the calcium sulfate hemihydrate.

2. The gypsum board of claim 1, wherein the gypsum core material has a total void volume of 25 to 90 volume percent.

3. The gypsum board of claim 1, wherein the hydraulic component comprises at least 85% calcium sulfate hemihydrate by weight based on the dry weight of the hydraulic component.

4. The gypsum board of claim 1, wherein the first repeating unit A is at least one carboxylic acid functional group containing olefinic moiety of formula Ia:

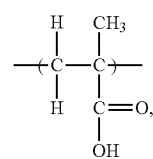

or a Na, K, or NH$_4^+$ salt thereof.

5. The gypsum board of claim 4, wherein the second repeating unit B is selected from at least one member of the group consisting of formula IVa:

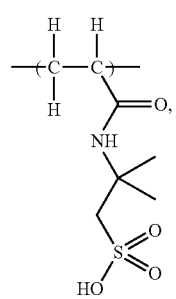

or one of its Na, K, or NH$_4^+$ salts.

6. The gypsum board of claim 4, wherein the second monomeric repeating unit B is at least one vinyl sulfonate selected from the group consisting of vinyl sulfonate of the formula IVa and vinyl sulfonate of the formula IVb:

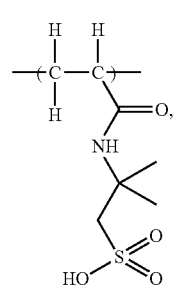

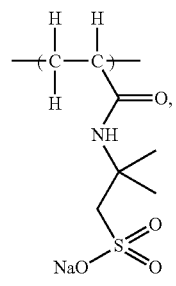

wherein the molar ratio of the first repeating unit A to the second repeating unit B is A is between 1:9 and 9:1;

wherein the gypsum core material has a total void volume of 10 to 92 volume percent.

7. The gypsum board of claim 4, wherein the linear polycarboxylate anionic dispersant is methacrylic acid-co- 2-acrylamido-2-methyl-propane sulfonate which is a copolymer of 2-Acrylamido-2-methylpropane sulfonic acid of formula V

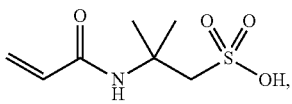

V or one of its Na, K, or $NH_4^+$ salts, and methacrylic acid of formula VI

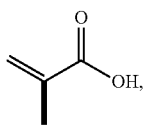

VI or one of its Na, K, or $NH_4^+$ salts.

8. The gypsum board of claim 4, wherein the second monomeric repeating unit B has the structure IVb:

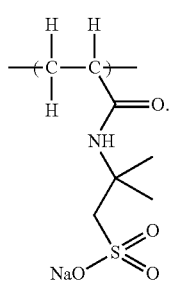

IVb wherein the molar ratio of the first repeating unit A to the second repeating unit B is 1:4 to 4:1;
wherein the weight average molecular weight of the linear polycarboxylate anionic dispersant is 5000 to 60000 Daltons.

9. The gypsum board of claim 8, wherein the molar ratio of the first repeating unit A to the second repeating unit B is between 2:3 and 7:3;
wherein the weight average molecular weight of the linear polycarboxylate anionic dispersant is 5000 to 35000 Daltons.

10. The gypsum board of claim 9, wherein the mixture further comprises sodium trimetaphosphate.

11. The gypsum board of claim 1, having an absence of cement.

12. The gypsum board of claim 11, further comprising vermiculite but there being an absence of other silicates.

13. The gypsum board of claim 1, wherein the calcium sulfate hemihydrate comprises less than 600 ppm of soluble salt.

14. The gypsum board of claim 1, wherein the hydraulic component consists of a stucco, wherein the calcium sulfate hemihydrate is at least 80 wt. % of the stucco, wherein the stucco further comprises clay, the clay is 0.5% to 15% by weight of the stucco.

15. The gypsum board of claim 8, wherein the dispersant is present in the slurry in amount of about 0.05% to about 0.5% by weight of the dry dispersant calculated as a percentage of the calcium sulfate hemihydrate, and wherein the weight average molecular weight of the linear polycarboxylate anionic dispersant is 5000 to 35000 Daltons.

16. The gypsum board of claim 15, wherein the dispersant is present in the slurry in amount of about 0.25% to about 0.5% by weight of the dry dispersant calculated as a percentage of the calcium sulfate hemihydrate.

17. The gypsum board of claim 1, wherein the gypsum core material further comprises a pregelatinized starch, and one or more enhancing materials selected from condensed phosphoric acids, each of which comprises 2 or more phosphoric acid units; and salts or ions of condensed phosphates, each of which comprises 2 or more phosphate units.

18. The gypsum board of claim 1, wherein the gypsum core material results from a slurry comprising:
a mixture of
water;
a hydraulic component comprising at least 50% calcium sulfate hemihydrate by weight based on the dry weight of the hydraulic component, whereby the calcium sulfate hemihydrate reacts with the water to form calcium sulfate dihydrate; and
the linear polycarboxylate anionic dispersant comprising the first monomeric repeating unit A and the second monomeric repeating unit B, and the absence of polyvinyl acetate monomeric units;
wherein the first repeating unit A is at least one carboxylic acid functional group containing olefinic moiety of formula I:

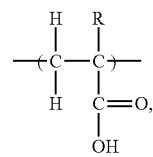

I wherein R is selected from the group consisting of $-CH_3$, and $-CH_2-C(O)-OH$, or a Na, K, or $NH_4^+$ salt thereof; and
wherein the second monomeric repeating unit B is at least one vinyl sulfonate according to formula II:

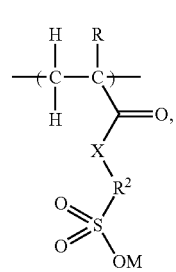

II wherein X is NH or O; $R^1$ is H or $-CH_3$; $R^2$ is the linear or branched alkylene group having the formula $-(C_nH_{2n})-$, wherein n=2 to 6; M=H, Na, K, or $NH_4^+$;
wherein the molar ratio of the first repeating unit A to the second repeating unit B is A is between 1:9 and 9:1;
wherein the weight average molecular weight of the linear polycarboxylate anionic dispersant is 3000 to 100000 Daltons;

wherein the slurry has a water to calcium sulfate hemihydrate weight ratio of 0.1-1.5:1.

19. The gypsum board of claim 1, wherein the first repeating unit A is an itaconic acid (IT) repeating unit of formula Ia

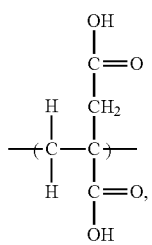

or one of its Na, K, or $NH_4^+$ salts, and
   wherein the molar ratio of the first repeating unit A to the second repeating unit B is 1:9 to 1:1;
   wherein the weight average molecular weight of the linear polycarboxylate anionic dispersant is 5000 to 60000 Daltons.

20. A method of making a gypsum board of claim 18, comprising:
   mixing the water, the hydraulic component comprising calcium sulfate dihydrate, and the linear polycarboxylate anionic dispersant to make the slurry, wherein the weight ratio of the water to calcium sulfate hemihydrate being mixed is 0.2-1.5:1;
   wherein the linear polycarboxylate anionic dispersant comprises the first monomeric repeating unit A and the second monomeric repeating unit B, and the absence of polyvinyl acetate monomeric units;
   wherein the first repeating unit A is at least one carboxylic acid functional group containing olefinic moiety of formula I:

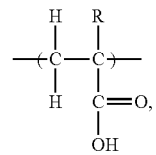

wherein R is selected from the group consisting of $-CH_3$, and $-CH_2-C(O)-OH$, or a Na, K, or $NH_4^+$ salt thereof; and wherein the second monomeric repeating unit B is at least one vinyl sulfonate according to formula II:

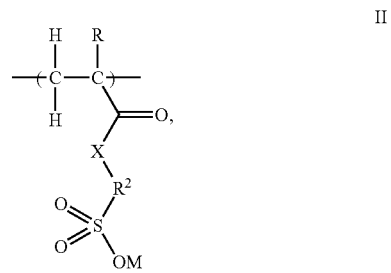

wherein X is NH or O; $R^1$ is H or $-CH_3$; $R^2$ is a linear or branched alkylene group having the formula $-(C_nH_{2n})-$, wherein n=2 to 6; M=H, Na, K, or $NH_4^+$;

wherein the molar ratio of the first repeating unit A to the second repeating unit B is A is between 1:9 and 9:1;

wherein the weight average molecular weight of the linear polycarboxylate anionic dispersant is 3000 to 100000 Daltons;

wherein the hydraulic component of the slurry comprises at least 50% calcium sulfate hemihydrate by weight based on the dry weight of the hydraulic component;

depositing the slurry on a cover sheet to form a gypsum core material;

wherein the slurry has 5 to 70 volume percent air bubbles;

allowing calcium sulfate hemihydrate in the slurry to convert to calcium sulfate dihydrate, and allowing the slurry to set to form the board.

* * * * *

UNITED STATES PATENT AND TRADEMARK OFFICE
CERTIFICATE OF CORRECTION

PATENT NO. : 10,442,732 B2
APPLICATION NO. : 15/588756
DATED : October 15, 2019
INVENTOR(S) : Annamaria Vilinska et al.

It is certified that error appears in the above-identified patent and that said Letters Patent is hereby corrected as shown below:

In the Claims

Column 33, Claim 1, after Line 15 delete:

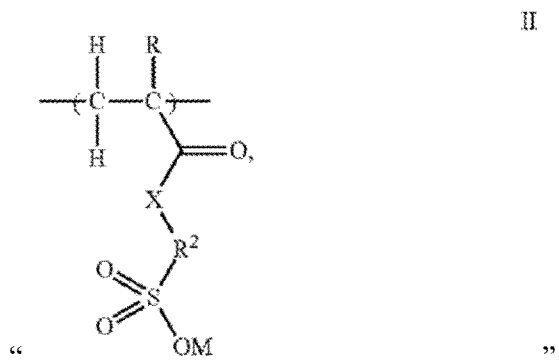

" "

And replace with:

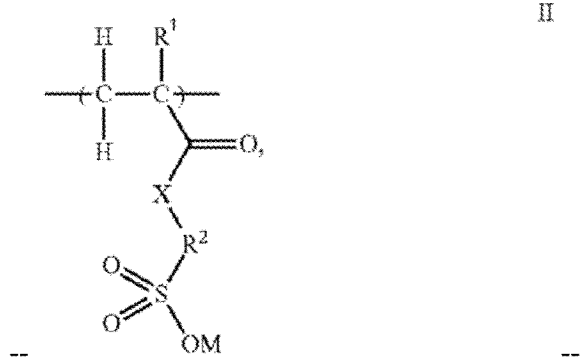

-- --

Column 36, Claim 18, Line 18 delete:
"a hydraulic component comprising at least 50% calcium"
And replace with:
-- a hydraulic component comprising at least 80% calcium --

Signed and Sealed this
Twenty-sixth Day of May, 2020

Andrei Iancu
*Director of the United States Patent and Trademark Office*

Column 36, Claim 18, Lines 45-59 delete:
"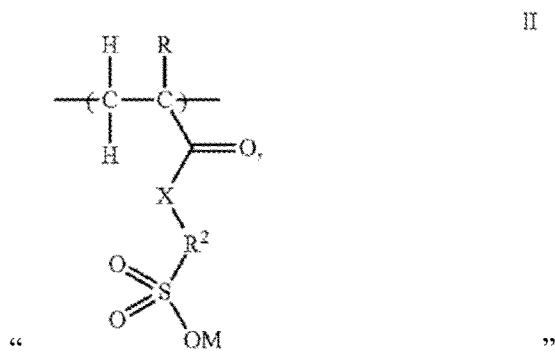"
And replace with:
--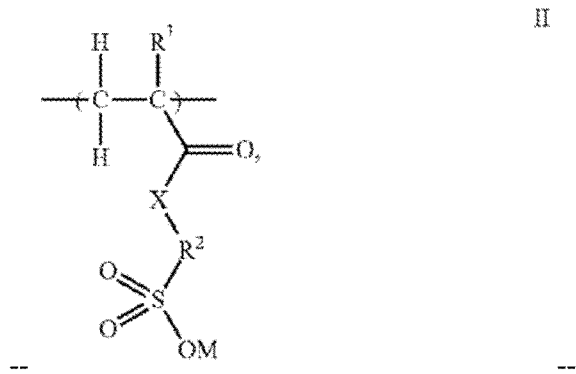--
Column 38, Claim 20, Line 33 delete:
"at least 50% calcium sulfate hemihydrate by weight"
And replace with:
-- at least 80% calcium sulfate hemihydrate by weight --